United States Patent [19]

Amy

[11] Patent Number: 4,761,735

[45] Date of Patent: Aug. 2, 1988

[54] DATA TRANSFER CIRCUIT BETWEEN A PROCESSOR AND A PERIPHERAL

[75] Inventor: Michael E. Amy, Winter Springs, Fla.

[73] Assignee: NCR Corporation, Dayton, Ohio

[21] Appl. No.: 943,463

[22] Filed: Dec. 19, 1986

[51] Int. Cl.4 .............................................. G06F 3/00
[52] U.S. Cl. ................................................... 364/200
[58] Field of Search ... 364/200 MS File, 900 MS File

[56] References Cited

U.S. PATENT DOCUMENTS 4,386,415  5/1983  Chadra ................................ 364/900
4,390,964  6/1983  Horky et al. ........................ 364/900

Primary Examiner—Raulfe B. Zache
Attorney, Agent, or Firm—Wilbert Hawk, Jr.; Edward Dugas; Floyd A. Gonzalez

[57] ABSTRACT

A data transfer circuit for transferring data between a processor such as a personal computer and a peripheral. A command and data bus is connected between the processor and the data transfer circuit, and a peripheral bus is connected between the peripheral and the data transfer circuit. A counter is reset to zero and a random access memory is connected to the command and data bus when the data transfer cirucit is addressed. The counter increments by one responsive to each read or write command on the command and data bus such that the processor may read data from or write data to the random access memory without having to supply an address. A microcomputer based controller supplies addresses when data is read out of or written into the random access memory by the peripheral.

11 Claims, 23 Drawing Sheets

| FIG. 2A | FIG. 2B | FIG. 2C |

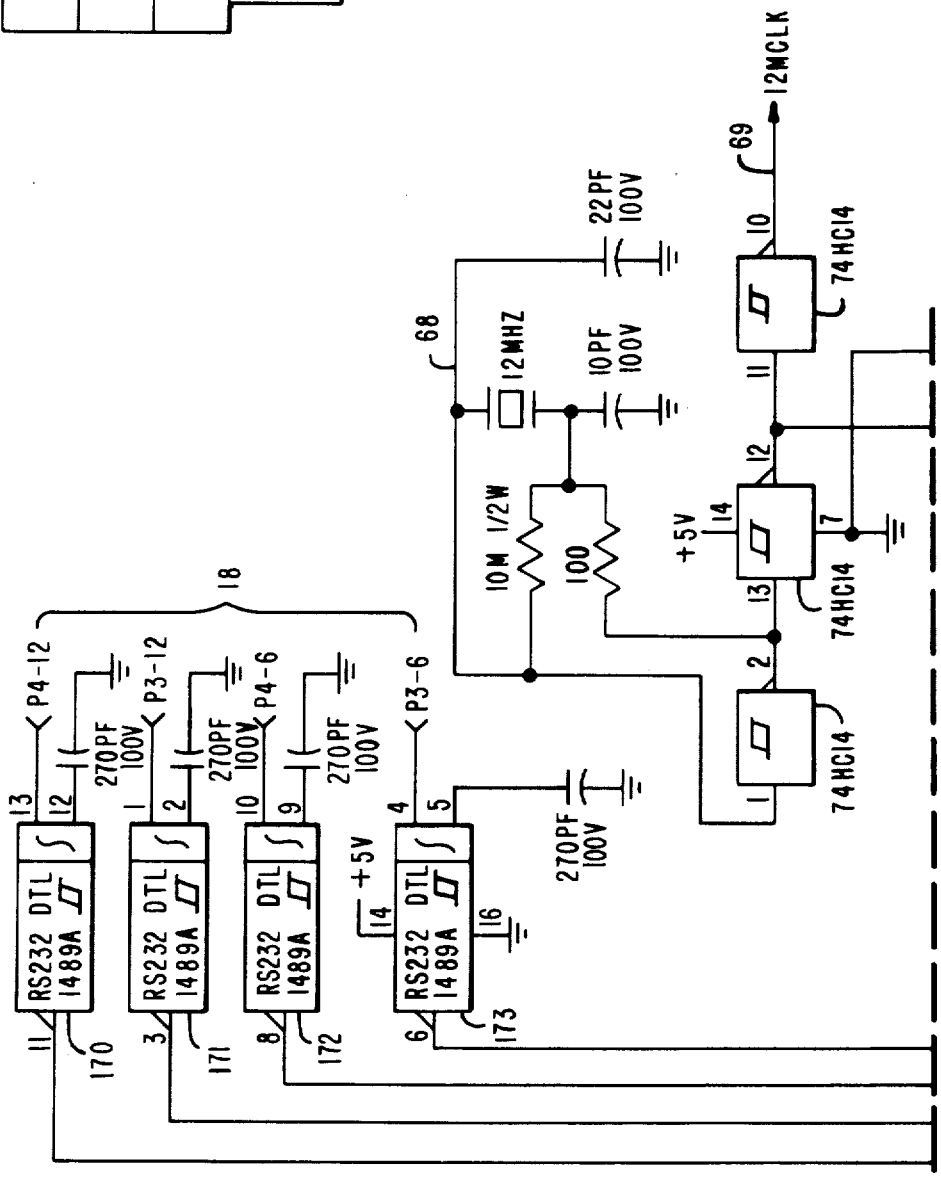

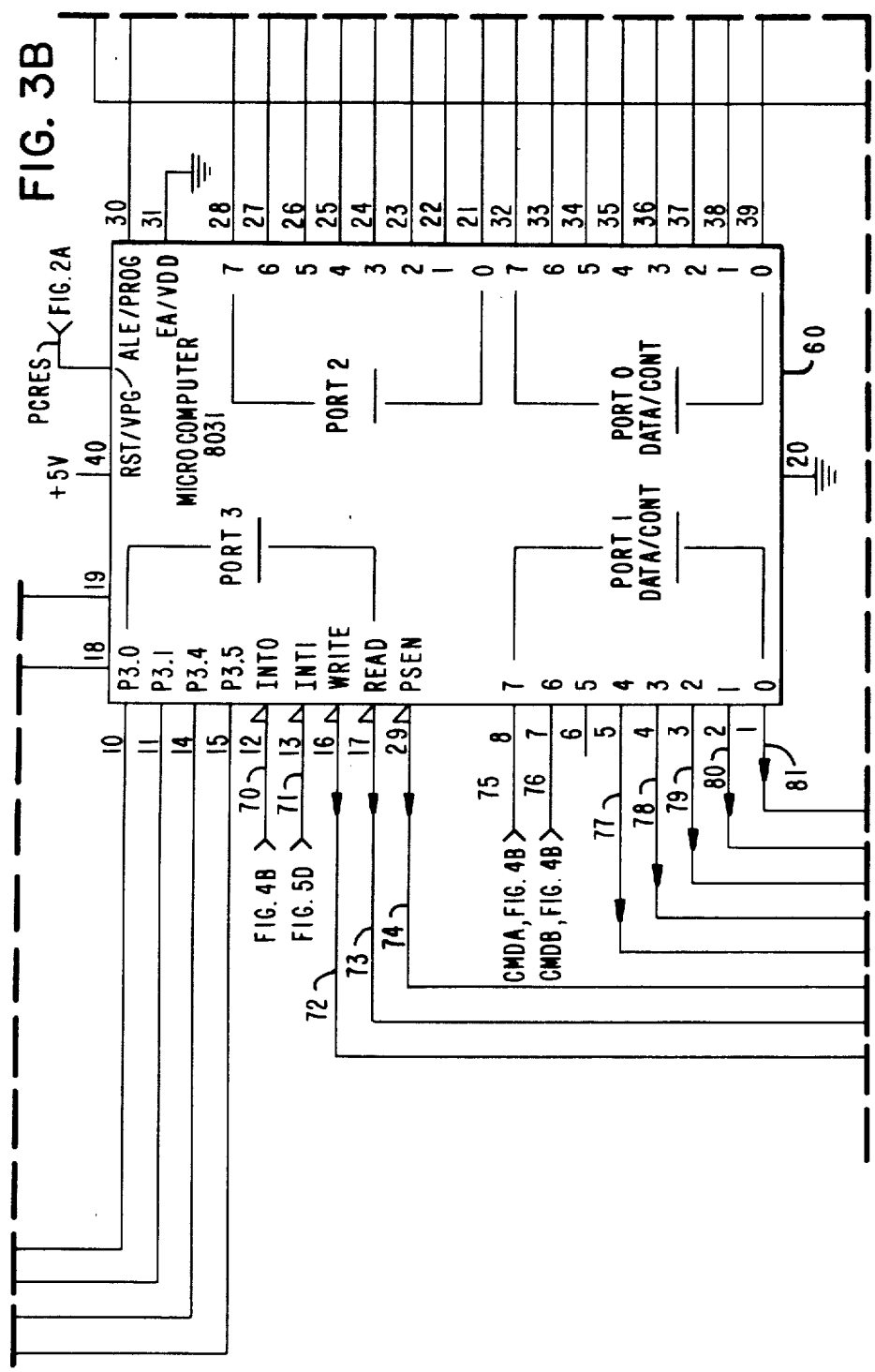

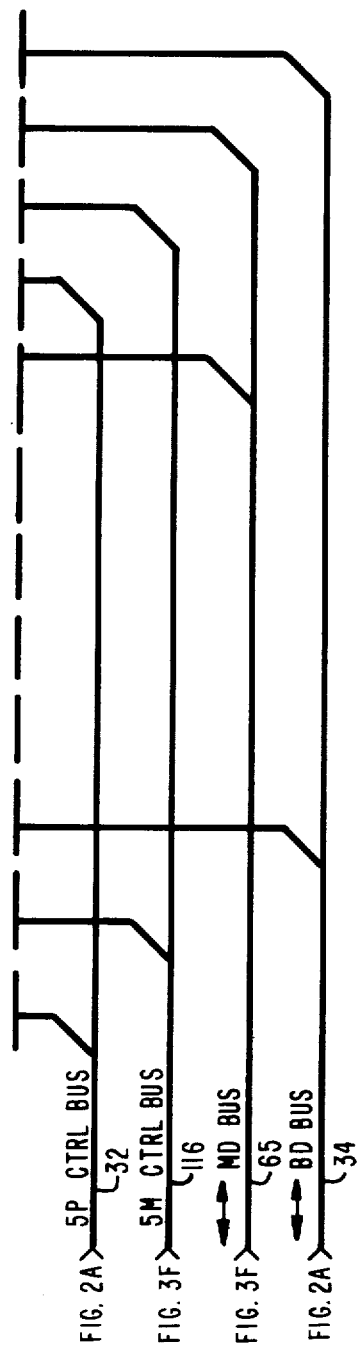
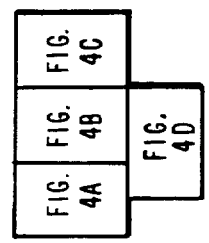
FIG. 4D
FIG. 4

DATA TRANSFER CIRCUIT BETWEEN A PROCESSOR AND A PERIPHERAL

BACKGROUND OF THE INVENTION

The present invention relates to a data transfer circuit for transferring data between a data processor and a peripheral device, and more particularly relates to a data transfer circuit having a random access memory device for storing data being repetitively read or written by a data processor and a data processing system.

U.S. Pat. No. 4,342,095 to Goodman for "Computer Terminal", issued July 27, 1982, discloses a computer system terminal wherein data may be fetched from a random access memory (RAM) by addressing the RAM using a program counter within the central processing unit of the computer system. Data is thus fetched from the RAM without the use of a direct memory access circuit.

U.S. Pat. No. 4,258,430 to Tyburski for "Information Collection and Storage System with Removable Memory", issued Mar. 24, 1981, discloses a removable memory pack for storing digital data having a RAM and an address counter which is reset to zero and incremented by timer pulses to access the memory locations in the RAM.

U.S. Pat. No. 4,467,420 to Murakami et al. for "One-Chip Microcomputer", issued Aug. 21, 1984, discloses a microcomputer which includes a central processing unit, a direct memory access controller and a random access memory. In one embodiment shown in FIG. 3, an address counter is controlled by the direct memory access controller for sequentially reading out a plurality of data words from the random access memory.

In U.S. Pat. No. 4,598,362 to Kinjo et al. for "Buffer Apparatus for Controlling Access Requests Among Plural Memories and Plural Accessing Devices", issued July 1, 1986, discloses request buffer apparatus for the transfer of data from a plurality of memory banks to a direct memory access unit. The request buffer apparatus includes buffer read address generators which are loaded with the starting address from the request buffers, and whose address count is incremented by one in response to each write request signal, and is decremented by one in response to each read request signal.

U.S. Pat. No. 4,599,689 to Berman for "Continuous Data Transfer System", issued July 8, 1986, discloses an apparatus which controls sequential direct memory access transfers between a plurality of buffer memories and a data translation device. A processor places an address in the apparatus the block of data resides. The apparatus logic generates addresses for sequentially transferring data words from the main memory.

SUMMARY OF THE INVENTION

In a specific embodiment, a data transfer circuit is disclosed for transferring data between a processor and a peripheral wherein the processor has a data and control bus for transmitting data and command signals. The data transfer circuit includes a random access memory (RAM) device having a plurality of addressable storage locations for storing data and address input terminals for inputting the address of the storage locations when reading data to or writing data from the RAM device. A first input/output circuit for connection to the data and control bus is connectable to the RAM device for transmitting data therebetween. The data transfer circuit also includes a second input/output circuit for connection to the peripheral and connectable to the RAM means for transmitting data therebetween. An addressable circuit in the first input/output circuit is addressable by data bits received from the data and control bus which, when addressed, connects the RAM device to the first input/output circuit. An address counter is connected between the first input/output circuit and the address input terminals of the RAM device for supplying addresses thereto. The address counter includes a reset circuit for resetting the address supplied therefrom to a set value when the addressable circuit is addressed. An incrementing circuit is connected between the first input/output circuit and the address counter for incrementing the address of the address counter responsive to each read or write command signal received by the first input/output circuit from the data and control bus.

It is a primary object of the present invention to provide a data transfer circuit having a RAM for storing data in a plurality of storage locations, and an address counter for providing addresses to the RAM for sequentially addressing the storage locations, the address counter being incremented by each read or write command directed to the RAM from a personal computer bus environment.

It is a further object of the present invention to provide a data transfer circuit for sequentially transferring data between a personal computer and a peripheral adapter device without the use of a direct memory access port of the personal computer at transfer rates and system overhead that equal or exceeds a direct memory access port.

It is a further object of the present invention to provide a data transfer circuit which is directly controlled by I/O read or I/O write commands on the personal computer bus.

These and other objects of the present invention will become apparent from the description of the preferred embodiment and drawings herein.

BRIEF DESCRIPTION OF THE DRAWINGS

FIGS. 3A-3F, arranged in accordance with the map of FIG. 3, form a schematic diagram of a microcomputer based control portion of the adapter of FIG. 1.

FIGS. 4A-4D, arranged in accordance with the map of FIG. 4, form a schematic diagram of a command and status register portion of the adapter of FIG. 1;

DESCRIPTION OF THE PREFERRED EMBODIMENT

Figure 1:
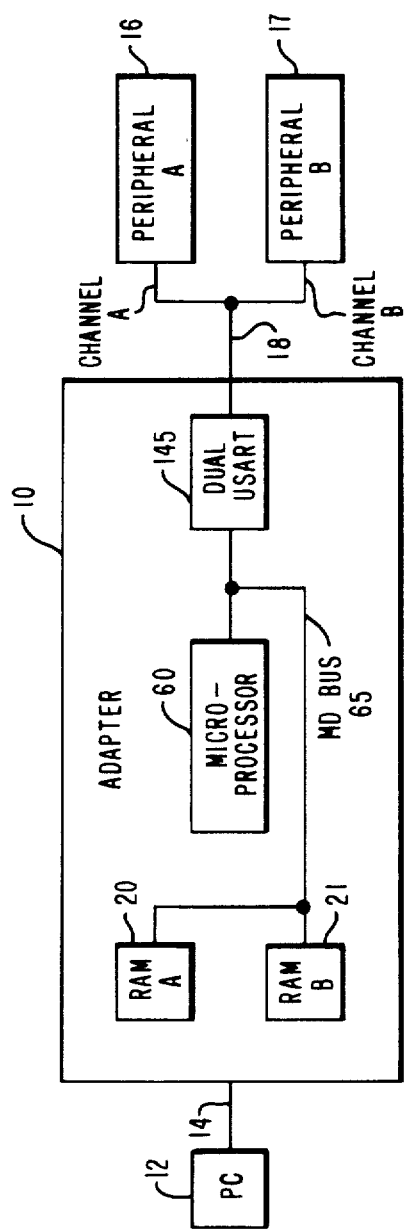
FIG. 1. is an overall block diagram showing a computer system having a communications adapter of the present invention.

FIG. 1 is an overall block diagram showing a system using a communications adapter 10 of the present invention. The system includes a personal computer (PC) 12 and a PC bus 14 connected to the communications adapter 10 of the present invention. The communications adapter 10 is connected to peripheral A (peripheral 16) and peripheral B (peripheral 17) via a peripheral bus 18. The PC 12 may be any one of a number of personal computers presently on the market. Personal computers based on the Intel 80286 Microprocessor, such as the IBM PC AT, are most preferred because data may be transferred to the adapter 10 using the REP OUTSB instruction. The INSB is used to transfer from the adapter 10 to the PC 12. However, other personal computers, such as those based on the Intel 8088/86 Microprocessor, may be used by providing a simple software loop, as will be explained.

The PC bus 14 is a buffered bi-directional bus over which address bits, data bits, control bits and power may be transmitted. The peripheral bus 18 may be any of a number of data peripheral buses over which data is transmitted between the peripherals 16 and 17, and a microprocessor system. In the present system, the peripheral bus 18 is a serial bus over which data is transmitted using the 3270 bysynchronous protocol, however other protocols may be used, as desired.

A pair of random access memories A (RAM 20) and B (RAM 21) are provided for handling data transfers between the peripherals 16 and 17, respectively, and the PC 12. The peripheral bus 18 has a channel A connected to peripheral 16, and a channel B connected to peripheral 17. The peripheral bus 18 is connected to a dual universal synchronous asynchronous receiver transmitter (USART) device 145. The USART device 145 is connected to a parallel local microprocessor data (MD) bus 65, which is connected to a microprocessor 60 and the RAMS 20 and 21. Parallel data from the PC bus 14 is loaded directly into the RAMS 20 and 21, as will be explained. Data is transferred via the microprocessor 60 between the RAMS 20 and 21, and the USART device 145, as will be explained.

Figures 2, 2A:
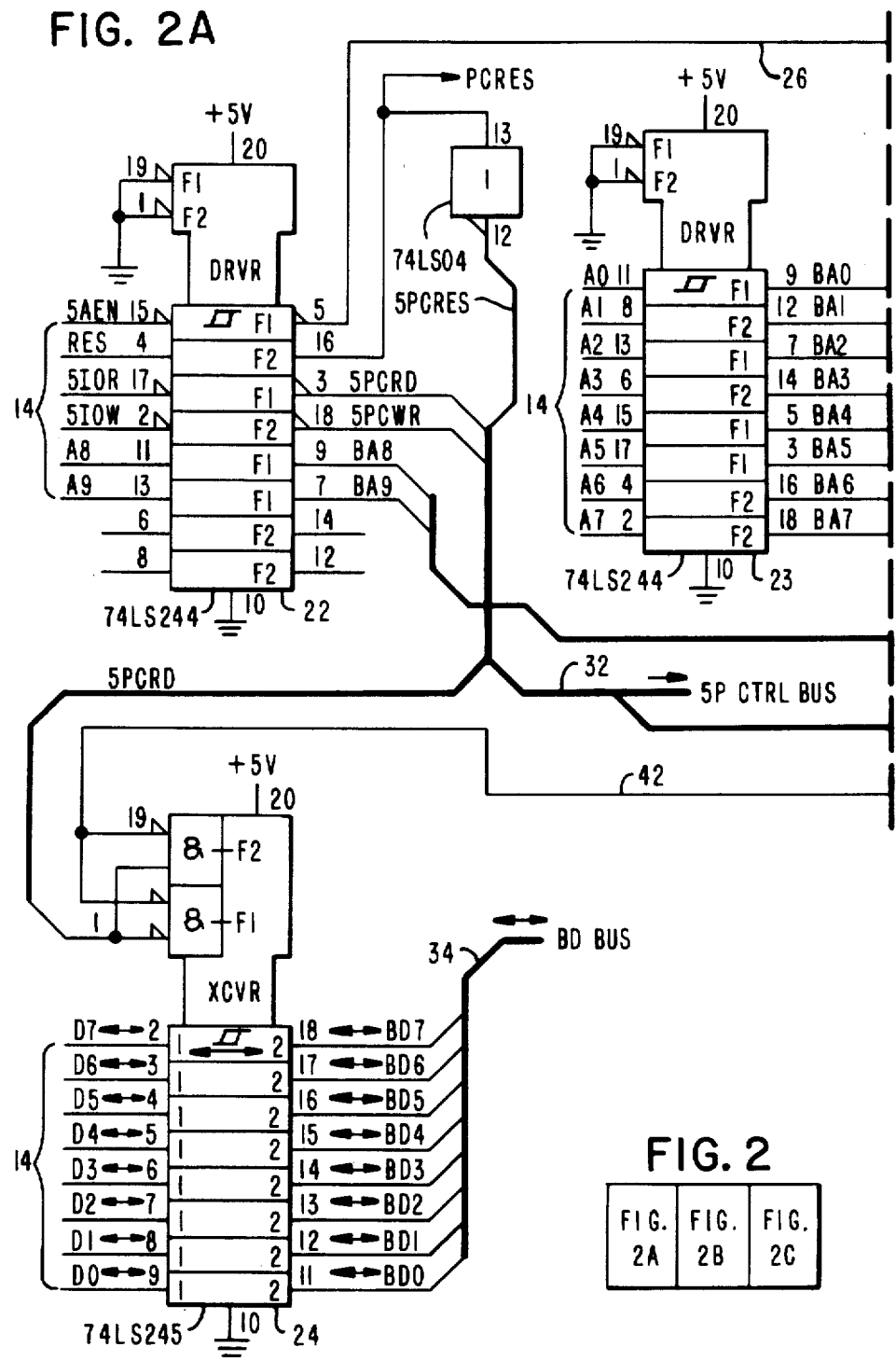
FIGS. 2A-2C, arranged in accordance with the map of FIG. 2, form a schematic diagram of a first input/output section of the adapter of FIG. 1.
Figure 2B:
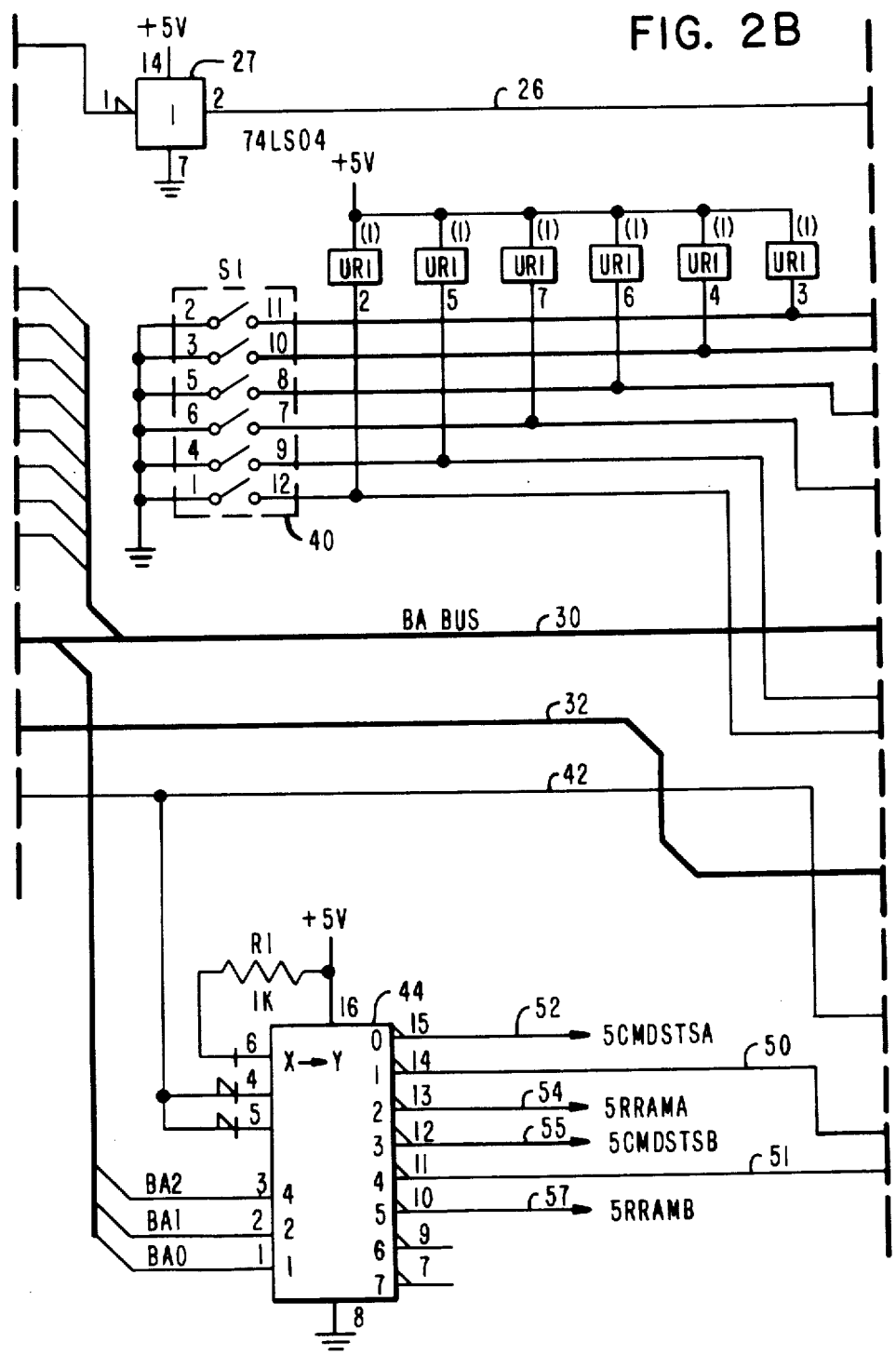
Figure 2C:
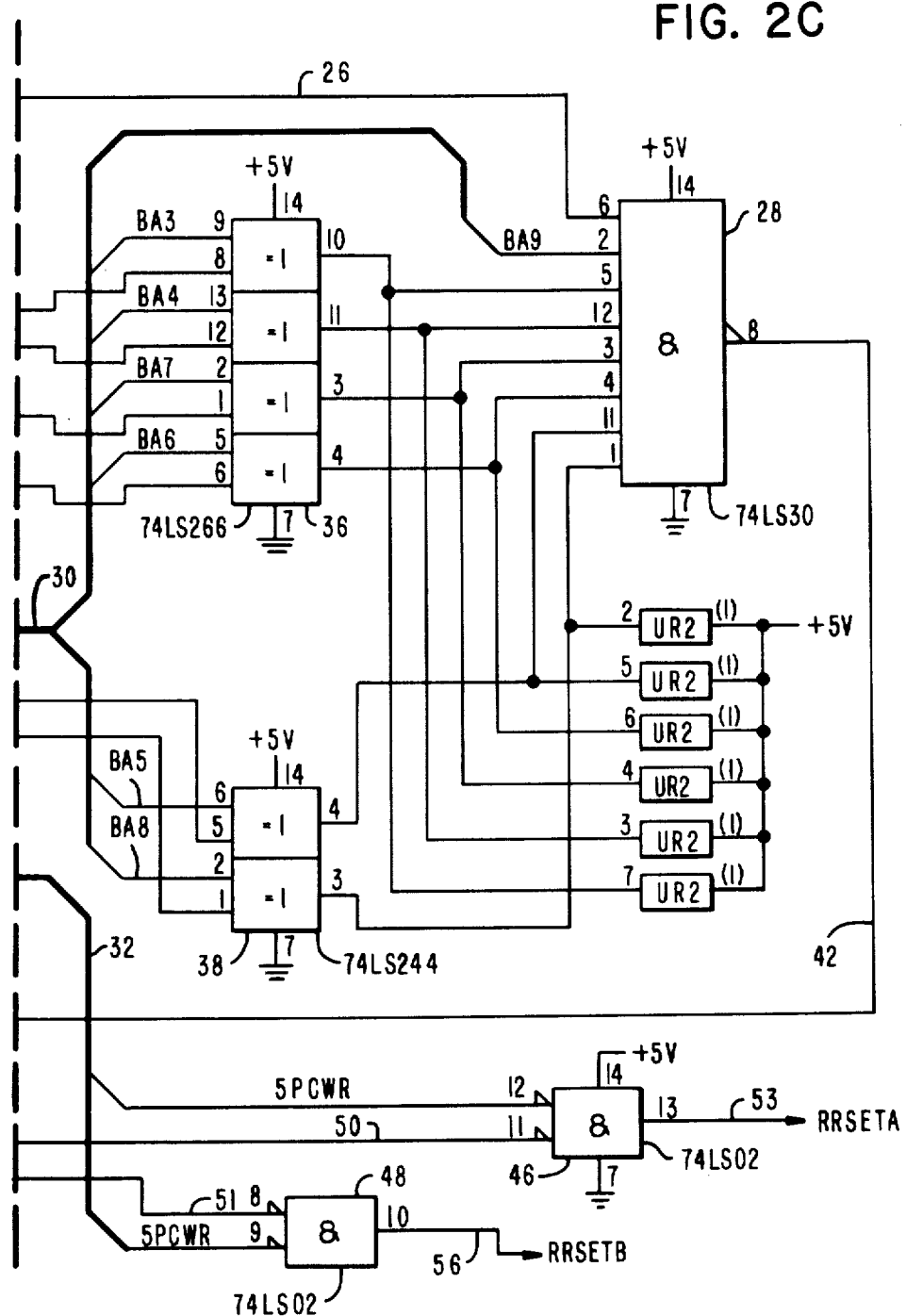

FIGS. 2A-2C, assembled in accordance with the map of FIG. 2, form a schematic diagram for that portion of the adapter 10 of FIG. 1 wherein data is transmitted between the PC 12 and the adapter 10. Referring to FIG. 2A, drivers 22 and 23 are connected to the PC bus 14 for receiving control signals and address bits from the PC 12. A transceiver 24 is connected to the PC bus 14 for receiving data bits from and sending data bits to the PC 12. In the labeling convention used herein, signals preceded by a number 5 are enabled in their low or zero state. Also, manufacturer's part numbers are included in the schematic diagrams of the figures. An address enable (5AEN) signal is received on pin 15 of the driver 22, a reset (RES) signal is received on pin 4, an input/output read (5IOR) signal is received on pin 17, and input/output right (5IOW) signal is received on pin 2, and the high order bits (A8 and A9) of the address bits are received on pin 11 and 13, respectively. The first eight address bits (A0-A7) are received on the inputs of the driver 23, and eight data bits (D0-D7) are connected to the "1" side of the transceiver 24. The 5AEN signal drives line 26, which is inverted by the inverter 27 (see FIG. 2B), and connected to one input of a NAND gate 28 (see FIG. 2C). The address bits (A0-A9) drive the buffered address (BA) bus 30 (see FIGS. 2B and 2C) of the adapter 10. The control signals RES, 5IOR and 5IOW are transmitted over the PC control (5P CTRL) bus 32. The 5P CTRL bus 32 includes reset signals (5PCRES) derived from the RES signal, a PC read (5PCRD) signal from the 5IOR signal, and a PC write (5PCWR) signal from the 5IOW signal.

A bi-directional buffered data (BD) bus 34 is connected to the "2" side of the transceiver 24.

Buffered address bits BA3-BA8 are connected to first inputs of exclusive OR gates 36 and 38 (see FIG. 2C), whose second inputs are connected to individual switches of a switch set 40 of FIG. 2B. An address for the adapter 10 of FIG. 1 is set by switches 40. The exclusive OR gates 36 and 38 act as comparators for comparing the address set by the switches 40 with the address of the bits BA3-BA8 of the BA bus 30. The output of the NAND gate 28 goes low when the adapter 10 is enabled by the 5AEN signal of FIG. 2A, the address of switches 40 match the address of the bits BA3-BA8, and the bit BA9 is high. The output of the NAND gate 28 is connected by a conductor 42 to enable pins of the transceiver 24 and a decoder 44. Pull up resistors UR1 and UR2 are connected to individual inputs and outputs of the exclusive OR gate 36 to pull up the voltages of their respective bits when they are in the one state.

When the output of the NAND gate 28 is enabled low, as described, the transceiver 24 is enabled. The direction of the transceiver 24 is determined by 5PCRD signal on pin 1, which is generated by the PC 12. The data bits D0-D7 are placed on the BD bus 34, and the decoder 44 decodes the value of the bits BA0-BA2. A pair of NAND gates 46 and 48 of FIG. 2C have their first inputs connected to the 5P CTRL bus 32 for receiving the 5PCWR signal, and their second inputs connected to pins 14 and 11 of decoder 44 by conductors 50 and 51, respectively.

When the input value on the inputs of the decoder 44 is equal to zero, a command status A (5CMDSTSA) signal is enabled on conductor 52; when its input value is equal to one and the 5PCWR signal is enabled, a RAM set A (RRSETA) signal on conductor 53 is enabled; when its input value is equal to two, a RAM A (5RRAMA) signal is enabled on conductor 54; when its input value is equal to three, a command status B (5CMDSTSB) signal is enabled on conductor 55; when its input value is equal to four and the 5PCWR signal is enabled, a RAM set B (RRSETB) signal is enabled on conductor 56; and when its input value is equal to five, a RAM B (5RRAMB) signal is enabled on conductor 57.

Figure 3C:
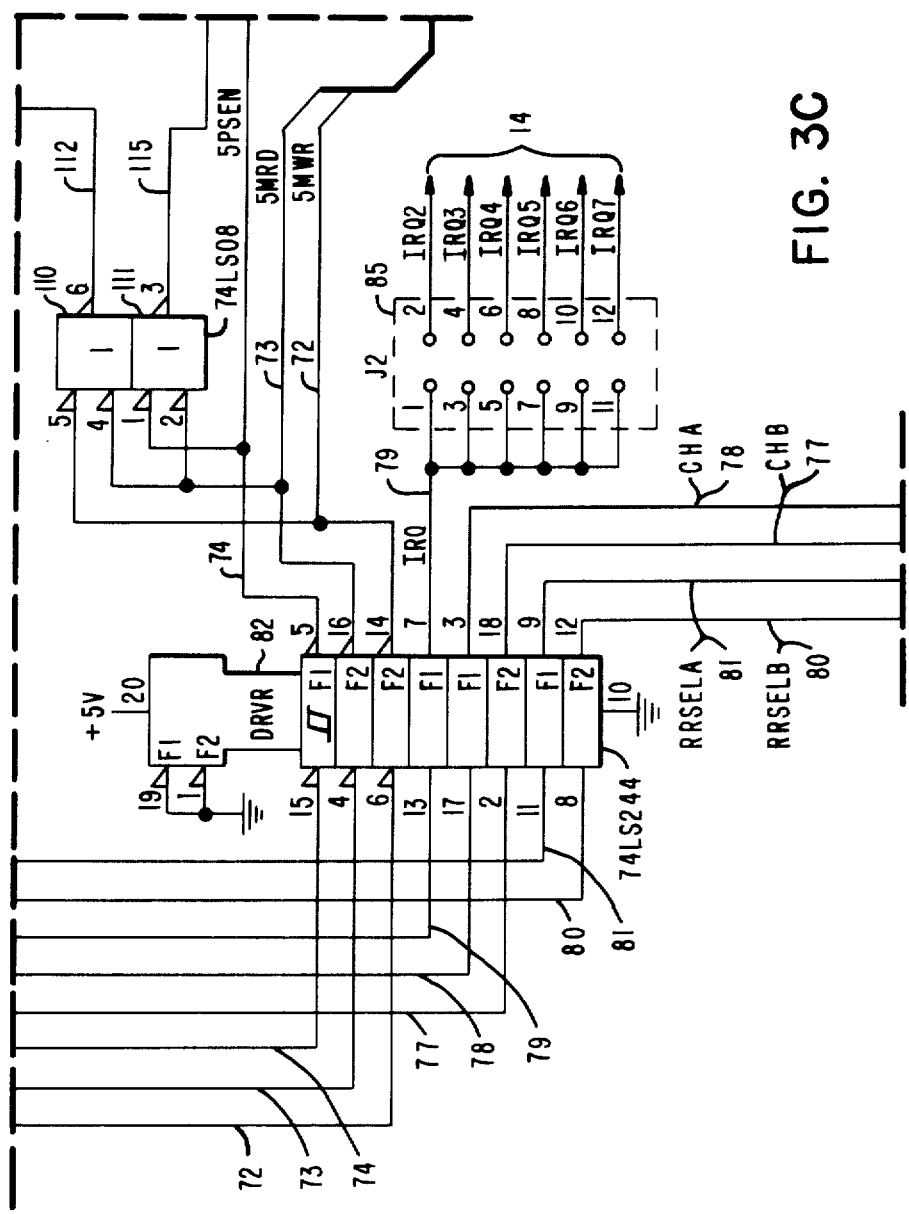

FIGS. 3A-3F, arranged in accordance with the map of FIG. 3, form a schematic diagram of the microcomputer control portion of the adapter 10 of FIG. 1. Referring to FIG. 3B, the microcomputer 60 discussed in FIG. 1 controls the operation of the adapter 10. The microcomputer 60 may be any one of a number of microprocessors, for example, an Intel 8031 microcomputer. The microcomputer 60 has four ports (PORT0-PORT3) for control and data signals. PORT0 receives and transmits eight data bits (MD0-MD7) from the MD bus 65 of FIG. 3F, or transmits the lower eight address bits (MA0-MA7) to a read only memory (ROM) 62. The ROM contains firmware for controlling the microcomputer 60. The upper eight address bits (MA8-MA15) for the ROM 62 are transmitted by PORT2 of the microcomputer 60. A register 63 is connected to PORT0 of the microcomputer 60 for holding the lower eight address bits MA0-MA7, such that PORT0 may be used both for the transmission of address bits and the receipt of data bits. The address bits MA0-MA15 are placed on a microcomputer address (MA) bus 64, and the outputs (MD0-MD7) of the ROM 62 are connected to the MD bus 65. The MD bus 65 is connected to the "2" side of a transceiver 66, whose "1" side is connected to PORT0 of the microcomputer 60. Thus, the microcomputer may address the ROM 62 via its PORT0 and PORT2, and receive microinstructions stored therein via the MD bus 65 and the transceiver 66. Or the microcomputer 60 may output data from its PORT0 over the MD bus 65 via the transceiver 66.

A clock circuit 68 of FIG. 3A provides clock pulses to the microcomputer 60 of FIG. 3B, and a 12 megahertz clock (12 MCLK) signal on conductor 69, to be discussed later. Control signals from the peripheral bus 18 for the microcomputer 60 are received at PORT3 of the microcomputer 60 (see FIG. 3B) via RS232 interface devices 170, 171, 172 and 173. Interrupts from the PC 12 are inputted into the microcomputer 60 via conductor 70, and interrupts from the peripherals 16 or 17 are inputted into the microcomputer 60 via conductor 71, as will be explained.

Write commands (5MWR) are outputted on conductor 72 from pin 16 of PORT3, read (5MRD) commands are outputted on conductor 73 from pin 17 of PORT3, and a program select enable (PSEN) signal is outputted on conductor 74 from pin 29 of PORT3. A command CMDA signal is inputted from conductor 75 to pin 8 of PORT1, a command CMDB signal is inputted from conductor 76 to pin 7 of PORT1, a RAM select A (RRSELA) signal is outputted on conductor 77 from pin 5, a RAM select B (RRSELB) signal is outputted on conductor 78 from pin 4, an interrupt (IRQ) signal is outputted on conductor 79 from pin 3, a channel A (CHA) signal is outputted on conductor 80 from pin 2, and a channel B (CHB) signal is outputted on conductor 81 from pin 1. Conductors 72–74 and 77–81 are inputted into a driver 82 of FIG. 3C. For convenience, the output conductors of driver 82 are labeled the same as its input conductors.

Figure 3D:
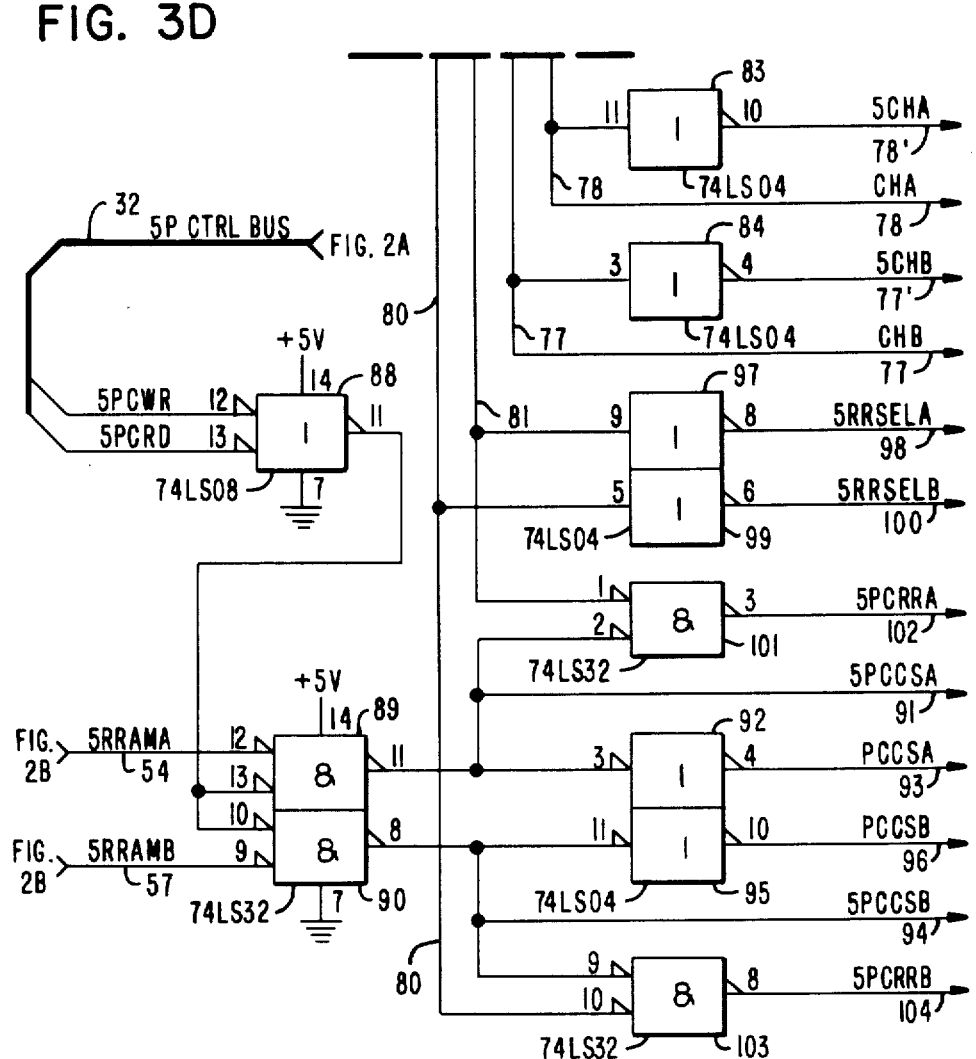

Inverters 83 and 84 of FIG. 3D invert the CHA signal to 5CHA on conductor 78' and the CHB signal to 5CHB on conductor 77' respectively. A jumper 85 of FIG. 3C is provided to output the interrupt signal IRQ on the proper interrupt conductor of the PC bus 14 for sending interrupt signals from the microcomputer 60 of FIG. 3B to the PC 12 of FIG. 1.

Referring to FIG. 3D, an OR gate 88 has its inputs connected to the 5P CTRL bus 32 for receiving the 5PCWR and 5PCRD signals. The output of the OR gate 88 is connected to AND gates 89 and 90 for enabling them when either the 5PCWR or 5PCRD signals are low. When the AND gate 89 is enabled and the 5RRAMA signal on conductor 54 is low, the output of AND gate 89 is low. When the AND gate 90 is enabled and the 5RRAMB signal on conductor 57 is low, the output of AND gate 90 is low. The output of the AND gate 89 is a PC chip select A (5PCCSA) signal on conductor 91, and is inverted by an inverter 92 to a PCCSA signal on conductor 93. The output of the AND gate 90 is a PC chip select B (5PCCSB) signal on conductor 94, and is inverted by an inverter 95 to a PCCSB signal on conductor 96. An inverter 97 inverts the RRSELA signal on conductor 81 to a 5RRSELA signal on conductor 98. An inverter 99 inverts the RRSELB on conductor 80 to a 5RRSELB signal on conductor 100. The inputs of an AND gate 101 are connected to conductor 81 and the output of the AND gate 89, and its output is connected to conductor 102.

Thus when the RRSELA signal is low (the local microprocessor 60 is not accessing RAM A) and the output of the AND gate 89 is low (the PC 12 is accessing the RAM A) the PC RAM A (5PCRAMA) signal on conductor 102 is low. The inputs of the AND gate 103 are connected to the conductor 80 and the output of AND gate 90, and its output is connected to conductor 104. Thus, when the RRSELB signal is low (the local microprocessor 60 is not accessing the RAM B) and the output of the AND gate 90 is low (the PC 12 is accessing the RAM B) the 5PCRRB signal on conductor 104 is low.

Referring to FIG. 3C, OR gates 110 and 111 provide chip enabling signals. The OR gate 110 has its inputs connected to conductors 72 and 73 for receiving the 5MWR and 5MRD signals, respectively, and its output connected to a conductor 112, which in turn is connected to the enablement input of a decoder 114 of FIG. 3E. Thus, when either the 5MWR or 5MRD signals are low, the decoder 114 is enabled. The inputs of the OR gate 111 are connected to conductors 73 and 74 for receiving the 5MRD and 5PSEN signals, and its output is connected to conductor 115, which in turn is connected to the direction enablement inputs of the transceiver 66. Thus, when the microcomputer 60 is reading microinstruction data from the ROM 62, the transceiver 66 is enabled to transmit the microinstruction data from the MD bus to PORT0 of the microcomputer 60.

Figure 3E:
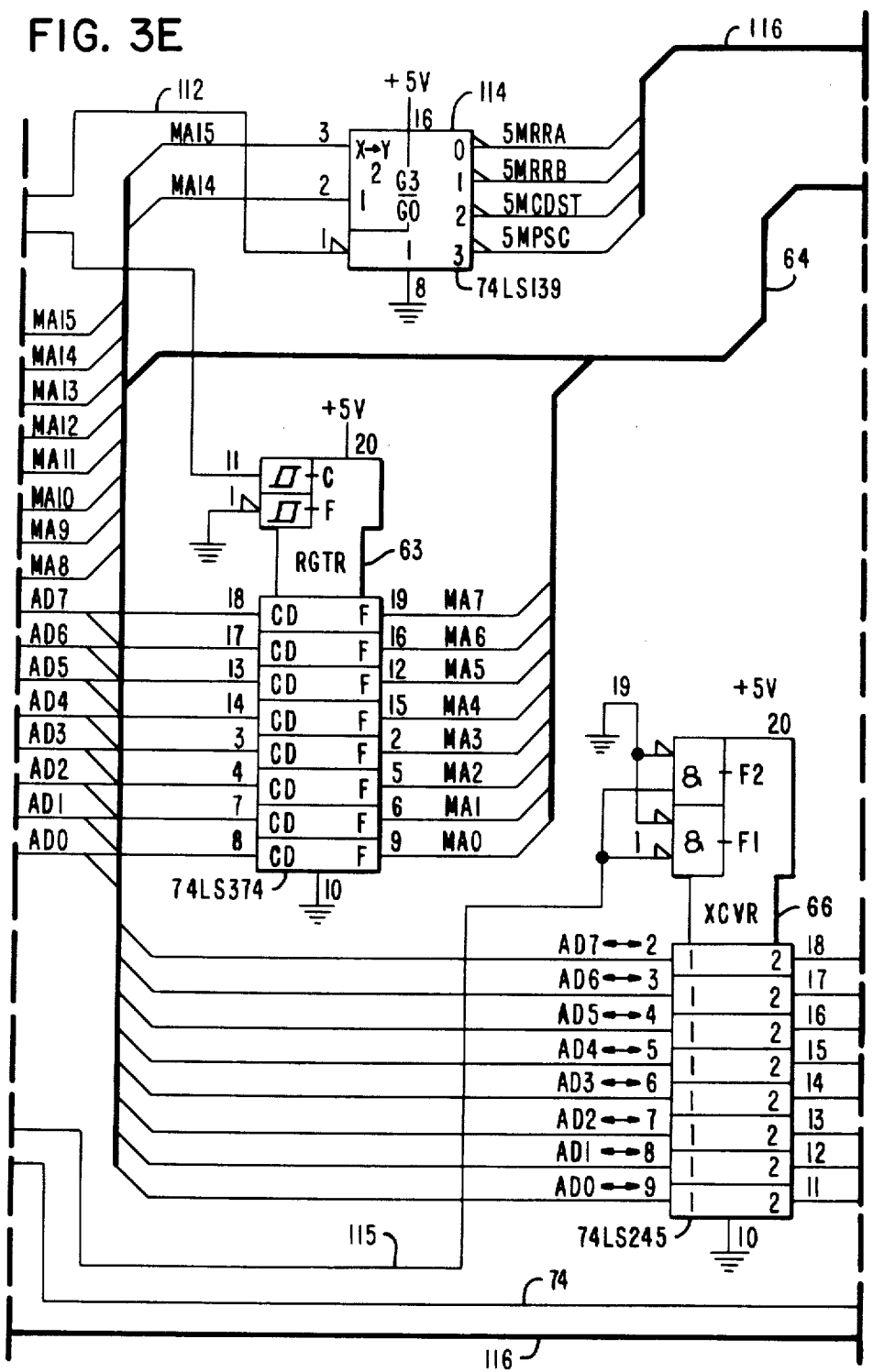

The decoder 114 of FIG. 3E decodes the address bits MA14 and MA15 when the microcomputer 60 performs a read or a write. If the address is zero, a microcomputer RAM A (5MRRA) signal is placed on the microcomputer control (5M CTRL) bus 116 of FIGS. 3E and 3F. If the address is one, a microcomputer RAM B (5MRRB) signal is generated; if the address is two, a microcomputer command status (5MCDST) signal is generated; and if the address is three, a multi-protocol serial controller chip select (5MPSC) signal is generated. These signals are used in placing the data of the peripheral bus 18 into one of the RAMS 20 or 21 of the adapter 10, as will be explained.

Figure 3F:
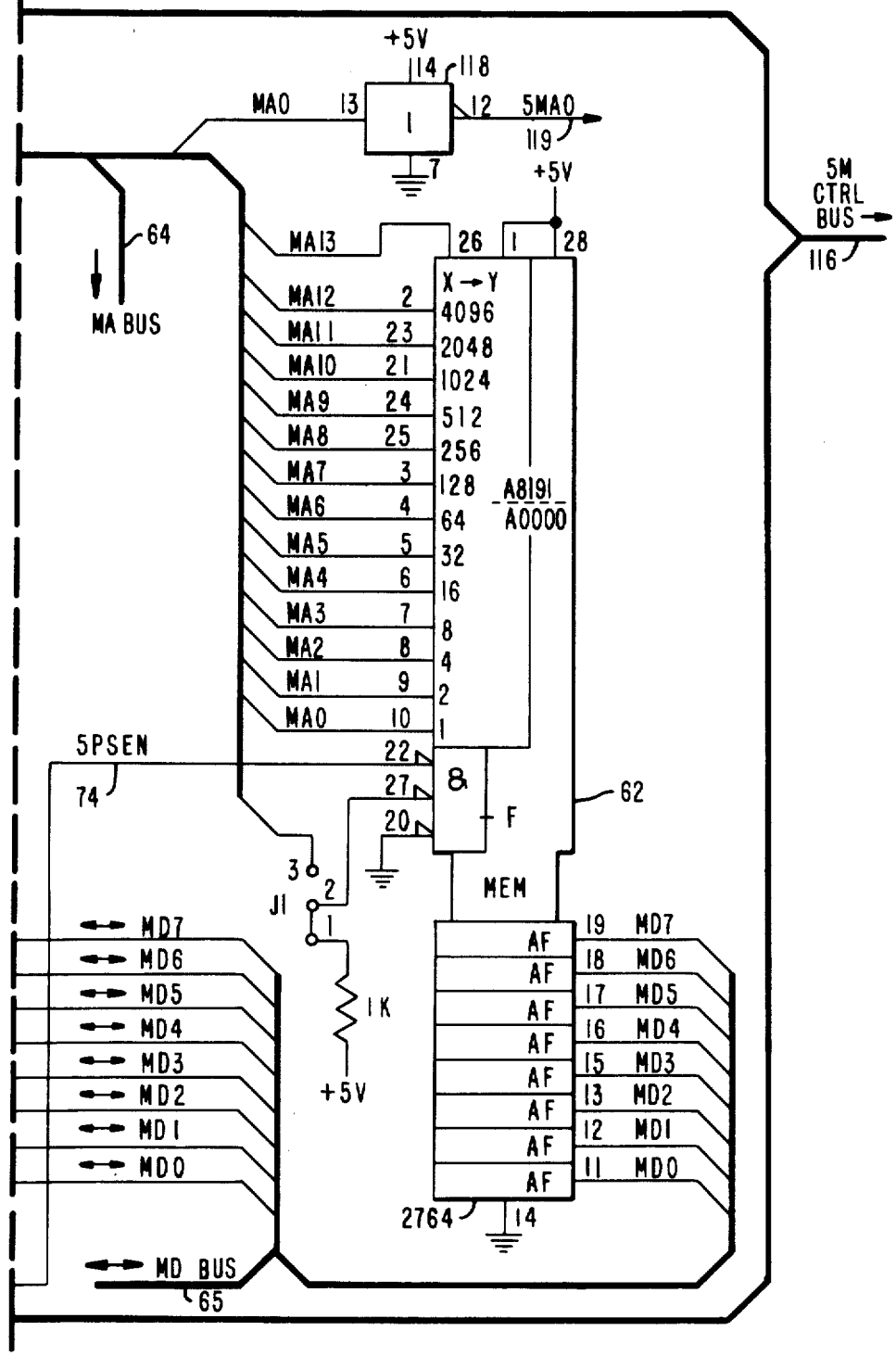

Referring to FIG. 3F, the MA0 bit from the MA bus 64 is inverted by an inverter 118, and placed on a conductor 119 as 5MA0.

Figure 4A:
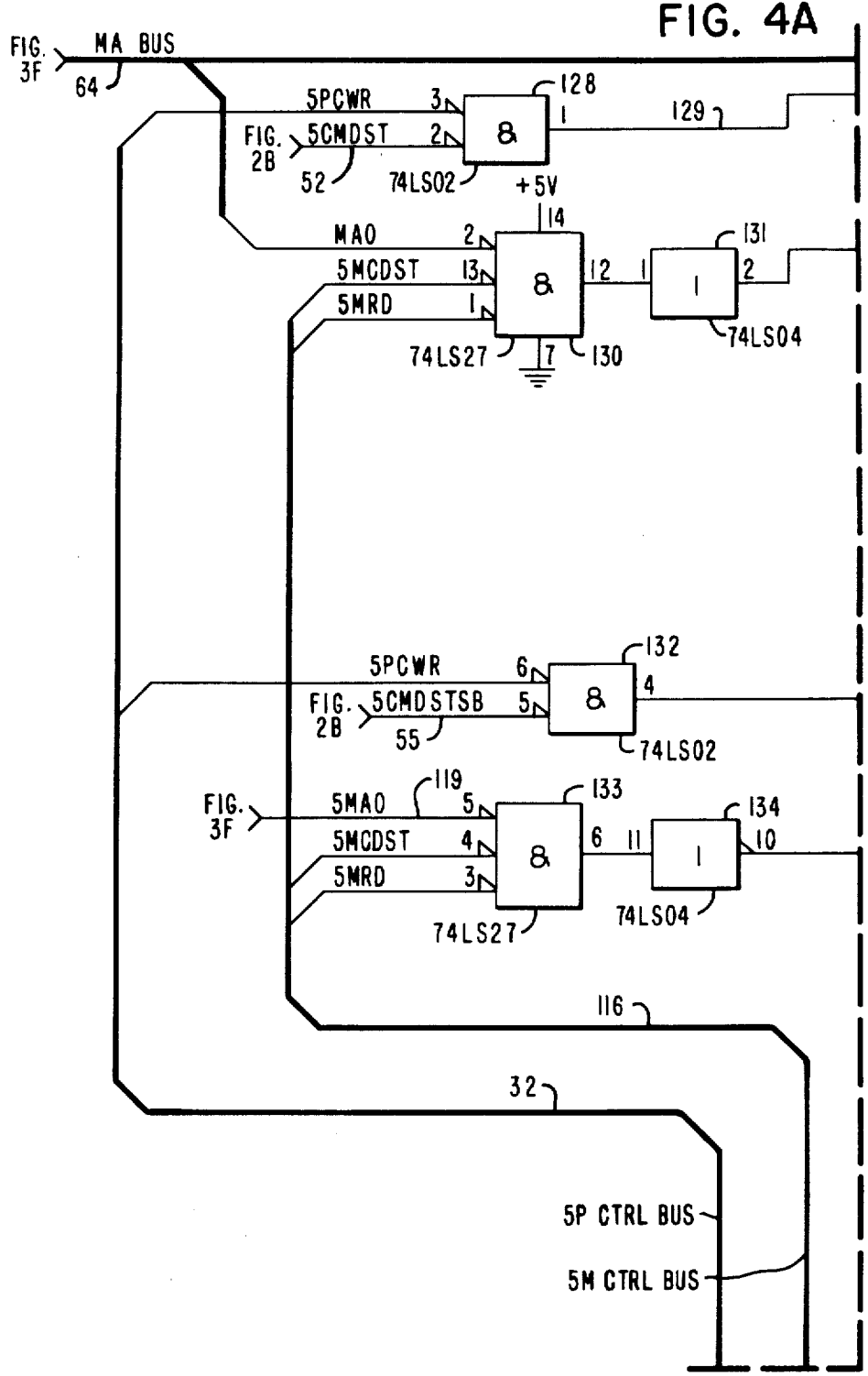
Figure 4B:
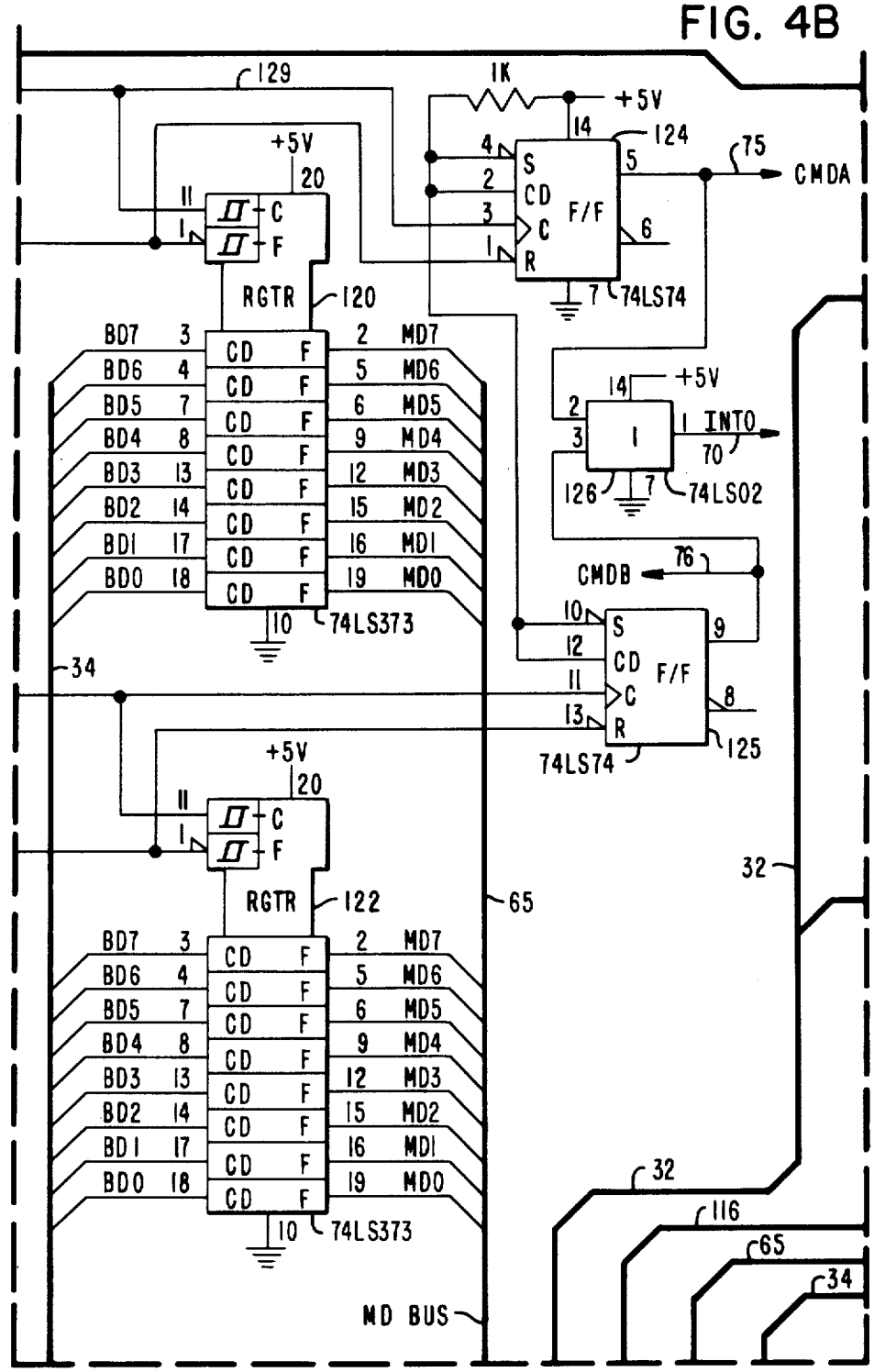
Figure 4C:
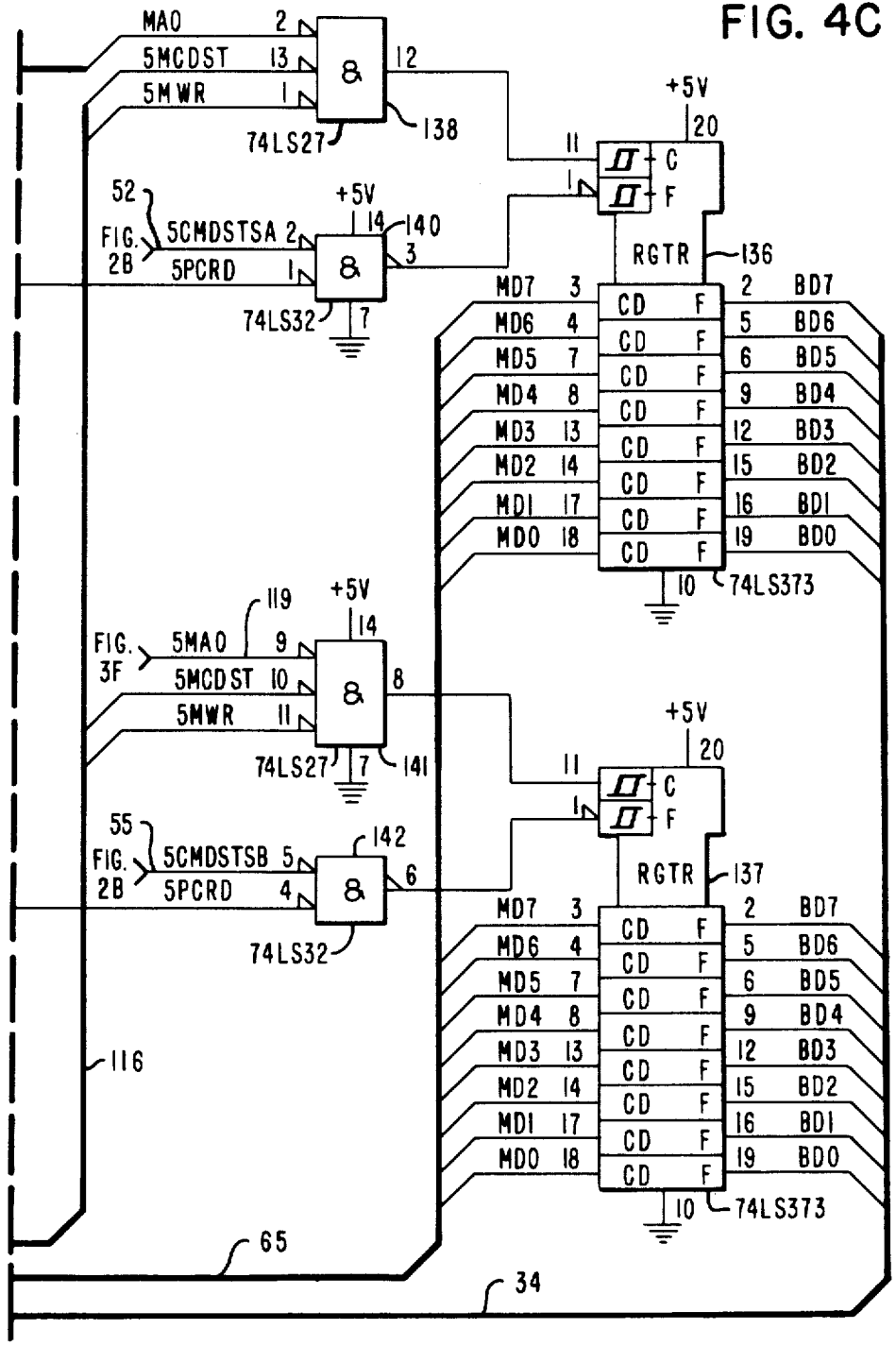

FIGS. 4A–4D arranged as shown in FIG. 4, form a schematic diagram of a command and status register portion of the adapter 10 of FIG. 1. The command and status registers are used to transfer command and status signals between the peripheral 16 and 17 and the adapter 10, and command and status signals between the PC 12 and the adapter 10, as will be explained. Referring to FIG. 4B, a register 120 stores eight bits BD0–BD7 of data from the BD bus 34 and places it, when strobed, on the MD bus 65 for data directed from the PC 12 to the RAM 20 of the adapter 10. A register 122 stores the eight bits BD0–BD7 of command and status data from the BD bus 34 and places it, when strobed, on the MD bus 65 for command and status data directed from the PC 12 to the RAM B 21 of the adapter 10. A D-type flip flop 124 provides the command A (CMDA) signal on conductor 75 (see FIG. 3B) when data is loaded into the register 120. A second D-type flip flop 125 provides the command B (CMDB) signal on conductor 76 when command and status data is loaded into the register 122. An OR gate 126 receives the CMDA and CMDB signals, and generates the INT0 interrupt signal on its output, which is connected to conductor 70. Conductors 70, 75 and 76 were previously described in connection with FIG. 3B. Thus, an INT0 signal will indicate to the microcomputer 60 that command and status data is stored in one of the registers 120 or 122 from the PC 12, and the signals, CMDA and CMDB will indicate to the microcomputer 60 which register contains the data from the PC 12. The command and status registers are used to pass command and status data between the adapter 10 and the PC 12 and are secondary to the control of the RAMS 20 and 21 other than to request the use of the RAMS 20 or 21 or to receive a status as to who is using the RAMS 20 or 21.

A NAND gate 128 of FIG. 4A receives the 5PCWR signal from the 5P CTRL bus 32 and the 5CMDSTSA signal from the conductor 52 (see FIG. 2B), and has its output connected to conductor 129 for strobing data into the register 120 and clocking the flip flop 124 such that the CMDA signal is high during a PC write when RAM A is selected. NAND gate 130 of FIG. 4A receives the MA0 bit from the MA bus 64 and the 5MCDST and 5MRD signals from the 5M CTRL bus 116, and has its outputs connected to the input of an inverter 131. The output of the inverter 131 is connected to pin 1 of the register 120 and the reset of the flip flop 124. Thus, when the MA0, 5MCDST and 5MRD signals are all low, the data in the register 120 is placed on the MD bus 65, and the flip flop 124 is reset thereby disabling the CMDA signal on conductor 75 and the INT0 signal on conductor 70.

NAND gates 132 and 133 and inverter 134 provide similar functions for taking data from the BD bus 34 and placing it on the MD bus 65 for the RAM 21. It will be seen that the 5MA0 signal on conductor 119 is inputted into one input of the NAND gate 133. Thus, the state of the lowest bit, MA0, outputted from the PORT0 of the microcomputer 60 of FIG. 3B determines if the register 120 for RAM 20 or the register 122 for RAM 21 is addressed when data is read out of either register 120 or 122.

Registers 136 and 137 of FIG. 4C transfer command and status data from the MD bus 65 to the BD bus 34, register 136 for RAM 20 and register 137 for RAM 21. A NAND gate 138 strobes data from the MD bus 65 into the register 136 when the MA0, 5MCDST and 5MWR signals are low. An AND gate 140 strobes data out of the register 136 onto the BD bus 34 when the 5CMDSTSA and 5PCRD signals are low. A NAND gate 141 strobes data into register 137 from the MD bus 65 when the 5MA0, 5MCDST and 5MWR signal are low. An AND gate 142 strobes data out of the register 137 onto the BD bus when the 5CMDSTSB and 5PCRD signals are low. Thus, when data is read from the microprocessor 60 of the adapter 10 to the PC 12, the state of the lowest bit, MA0, from the PORT0 of the microprocessor 60 of FIG. 3B determines whether data is read into register 136 for RAM 20 or register 137 for RAM 21.

Figure 5A:
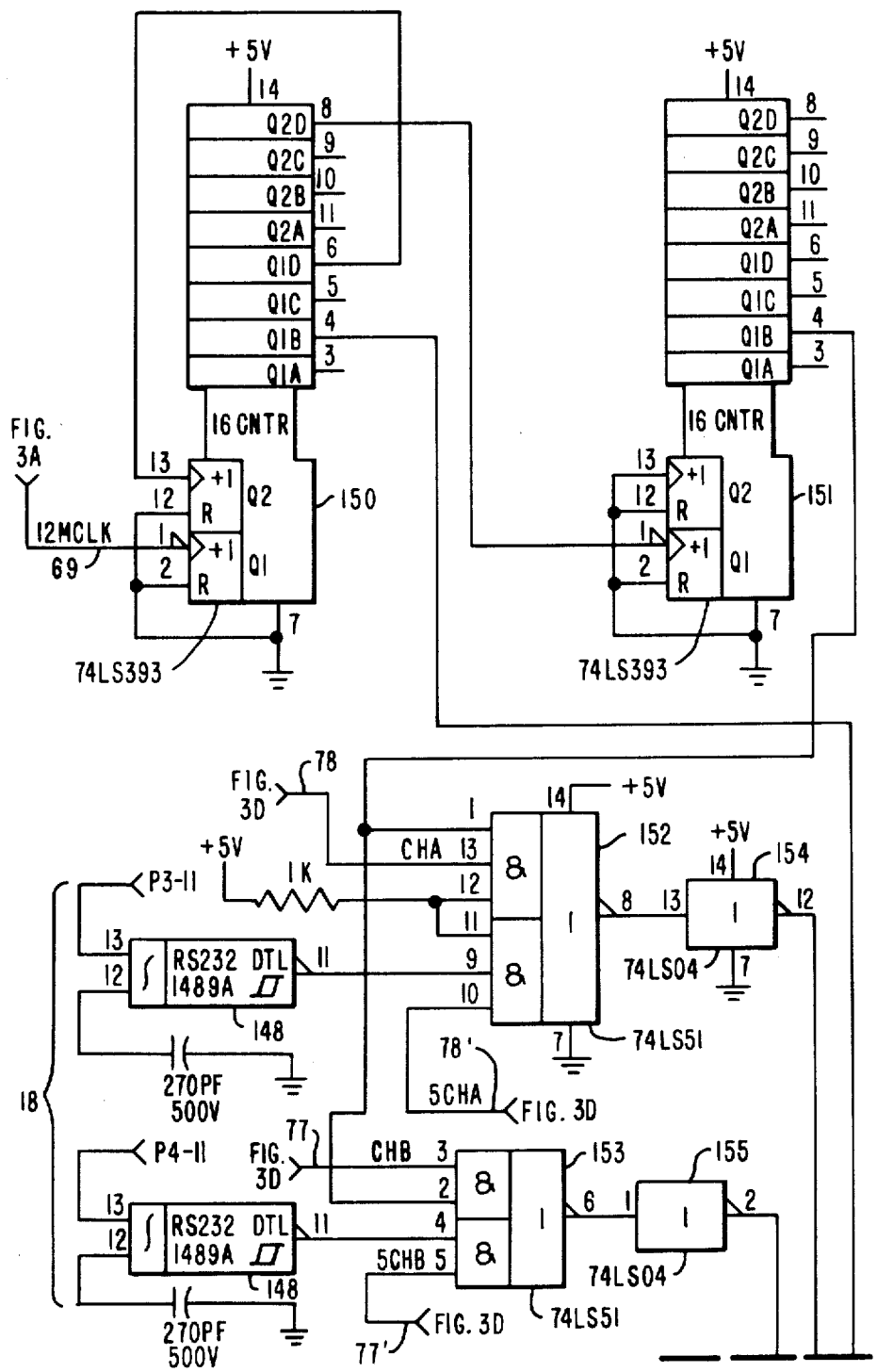
FIGS. 5A-5E, arranged in accordance with the map of FIG. 5, form a schematic diagram of a second input/output portion of the adapter of FIG. 1.
Figure 5B:
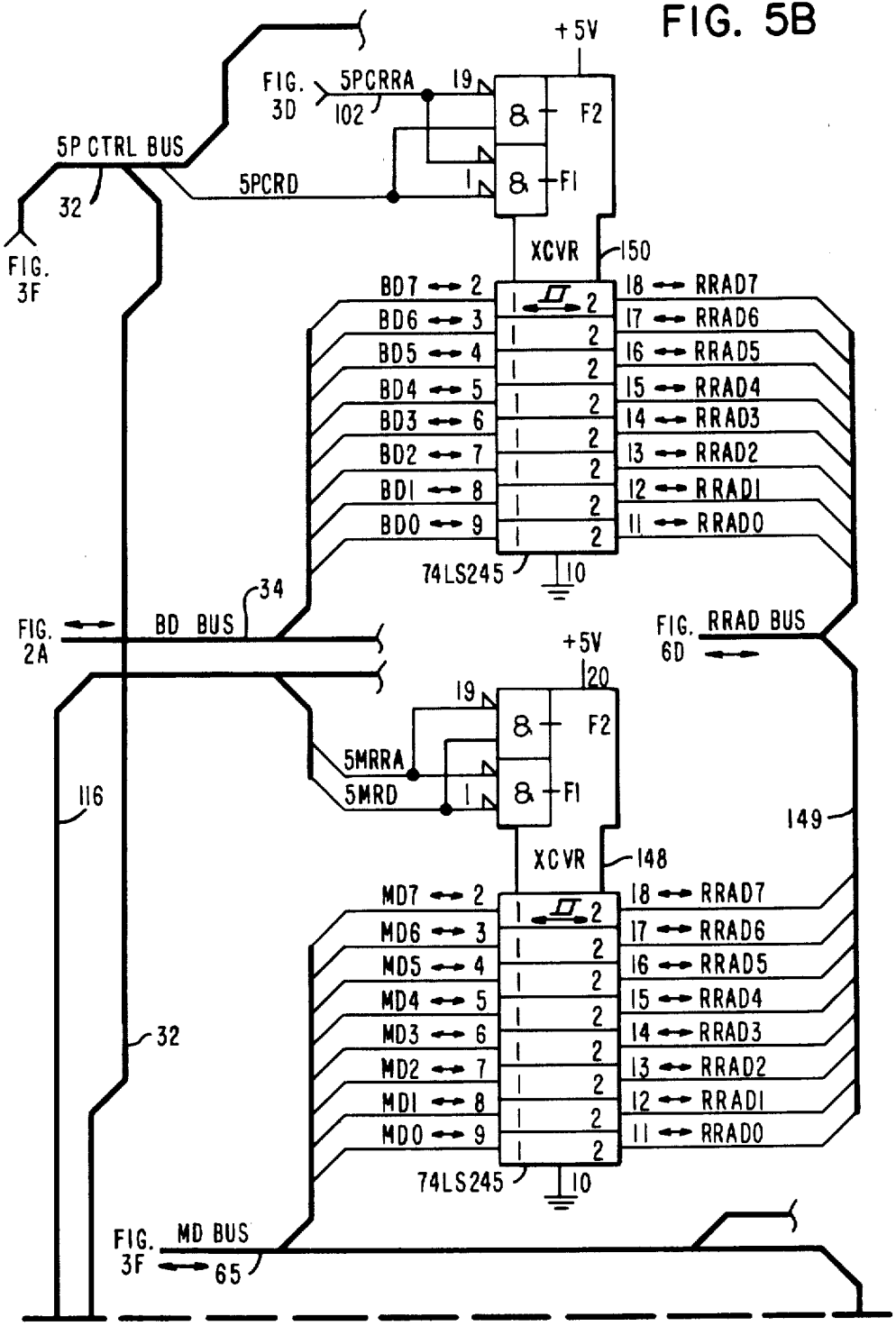
Figure 5C:
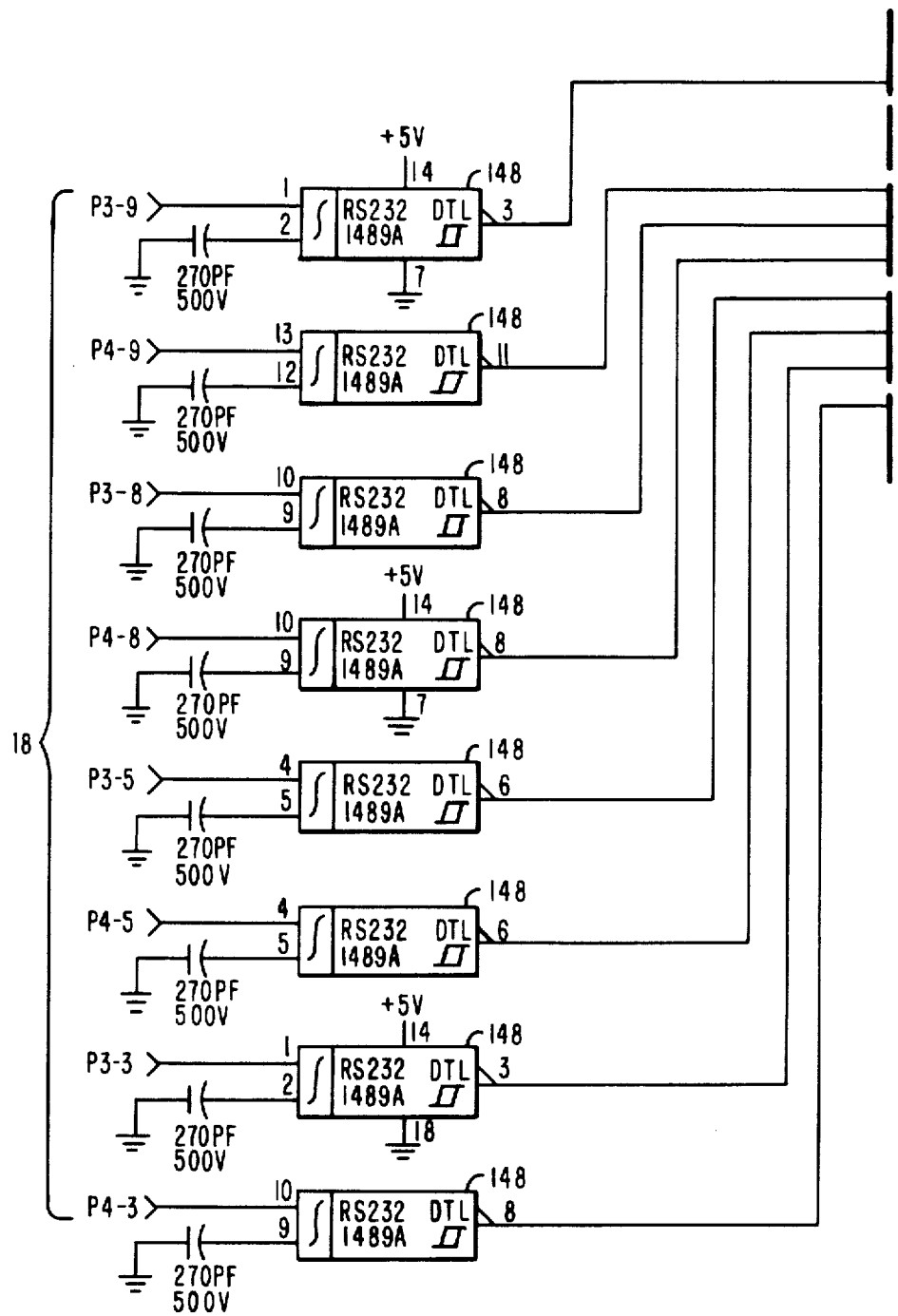
Figure 5D:
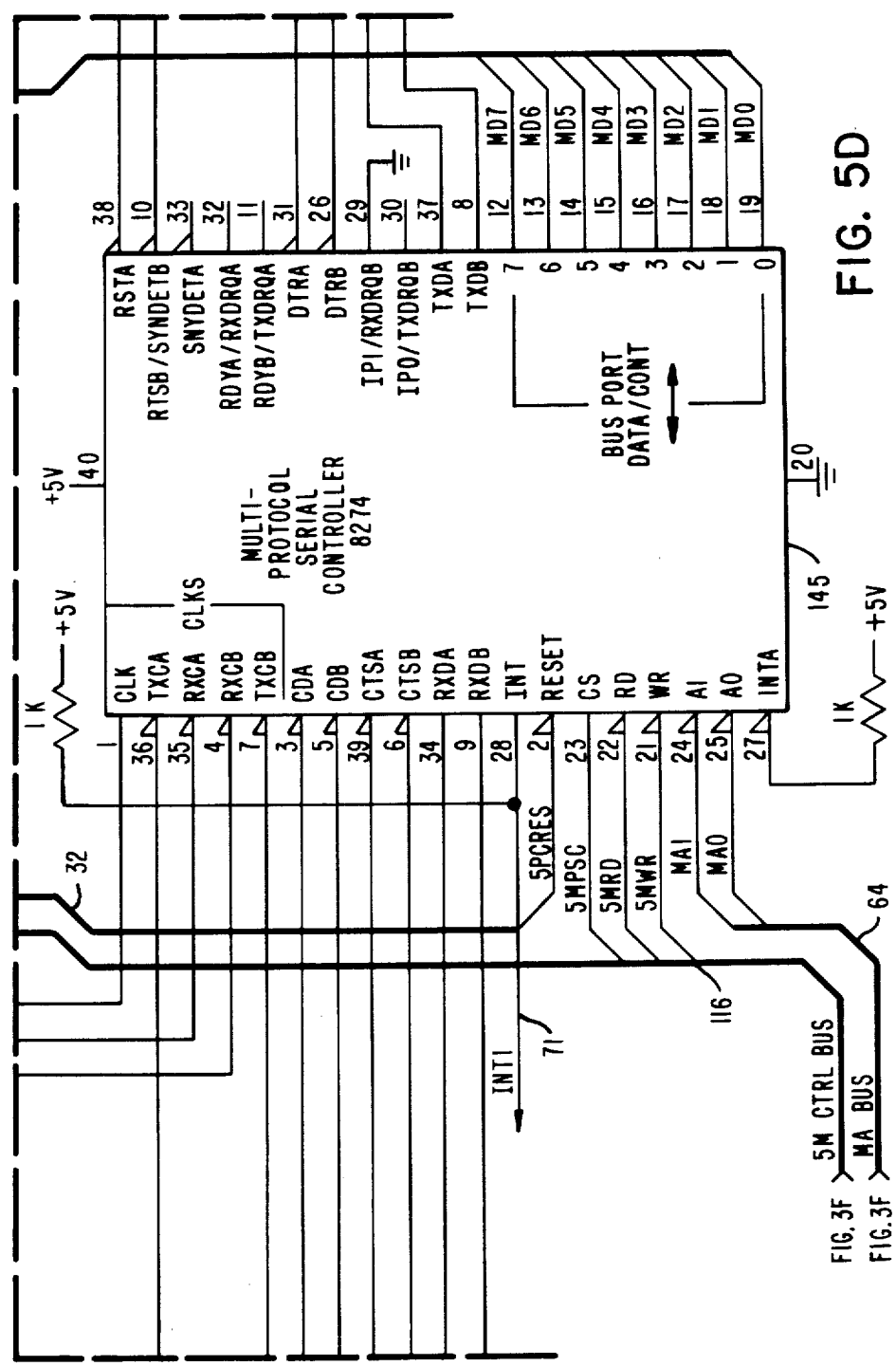
Figure 5E:
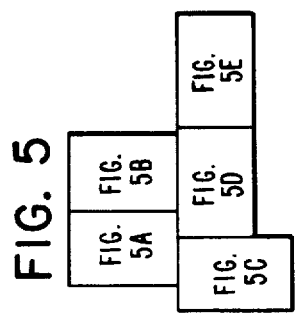
Figure 5E:
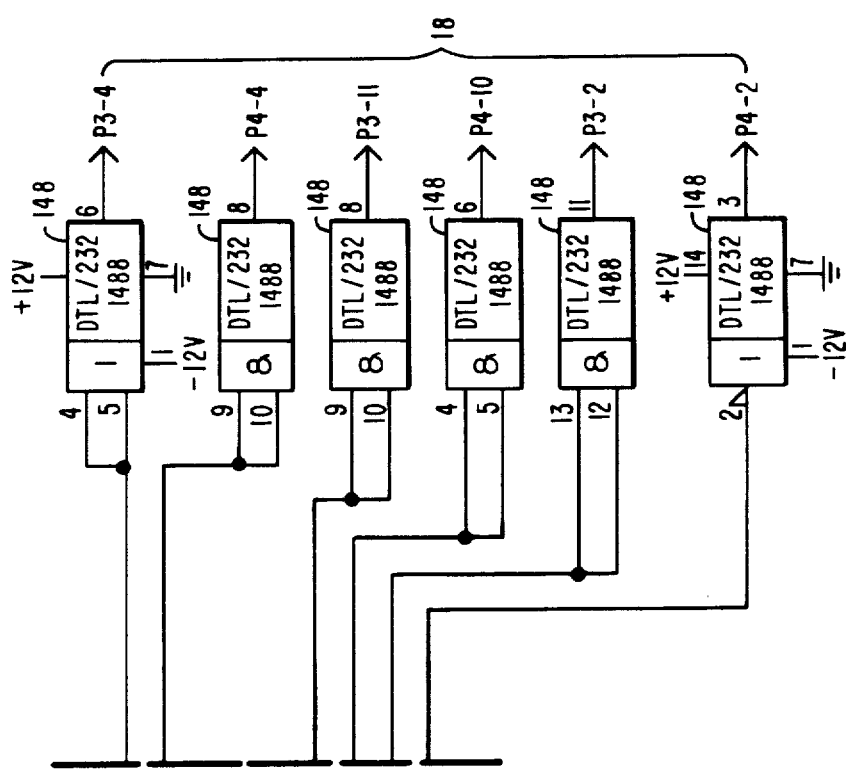

FIGS. 5A-5E, when arranged in accordance with the map of FIG. 5, form a schematic diagram of the input-/output section of the adapter 10 for transmitting data between the peripherals 16 and 17 and the adapter 10 of FIG. 1 via microprocessor 60. This input/output section includes the USART device 145 for converting serial data on the peripheral bus 18 to parallel data for the PC bus 14, and for converting parallel data on the PC bus 14 to serial data for the peripheral bus 18. The particular USART device 145 of FIG. 5D is an Intel 8274 multi-protocol serial controller (MPSC) device. However, the particular USART device 145 used may be selected from any of several readily available USART devices. A plurality of RS232 interface devices 148 of FIGS. 5A, 5C and 5E are connected to the USART device 145, as shown, to transmit data and control signals between the peripherals 16 and 17 of FIG. 1 and the USART device 145. Counters 150 and 151 are clocked by the 12MCLK signal on conductor 69 of FIG. 3A, and provide clock pulses to the UART device 145. Logic devices 152 and 153, along with inverters 154 and 155, receive pulses from the counter 151, and the CHA, 5CHA, CHB and 5CHB signals from the microcomputer 60 (see FIGS. 3B, 3C and 3D), and signals from the peripheral bus 18 to provide RX clock pulses for either channel A or channel B of the USART device 145. The operation of USART devices generally, and the Intel 8274 multi-protocol serial controller (MPSC) in particular, are well understood in the art. The low order bits (MA0, MA1) from the MA bus 64 of FIG. 3F are inputted into pins 24 and 25 (A1 and A0) of the MPSC device 145. As is known, the A0 input of the MPSC device 145 selects channel A or channel B during data or command transfers, and the A1 input selects between data or command information transfer. Conductor 71 of FIG. 3D is connected to pin 28 (INT) of the MPSC device 145 for transmitting INT1 signals from the MPSC device 145 to the microcomputer 60 (see FIG. 3B). The MD bus 65 of FIG. 3F is connected to the pins 12-19 of the MPSC device 145 for transmitting data and control bits. The 5MPSC, 5MRD and 5MWR signals from the 5M CTRL bus 116 of FIG. 3F are connected to pins 23 (CS), 22 (RD) and 21 (WR) respectively of the MPSC device 145. Referring to FIG. 5B, a transceiver 148 communicates the data between a RAM data (RRAD) bus 149 for RAM 20 (to be discussed in connection with FIG. 6D) and the MD bus 65. Transceiver 148 is controlled by signals 5MRRA and 5MRD of the 5M CTRL bus 116. Thus, data may be received from the peripheral bus 18 and placed on the RRAD bus 149 via the MPSC device 145 and the transceiver 148, or it may be taken off of the RRAD bus 149 and placed on the peripheral bus 18, also via the transceiver 148 and the MPSC device 145. A transceiver 150 communicates data between the BD bus 34 of FIG. 2A and the RRAD bus 149 of FIG. 6C. The transceiver 150 is controlled by the 5PCRD signal of the 5P CTRL bus 32 of FIG. 3F and the 5PCRRA signal on conductor 102 of FIG. 3D. Thus, data may be sent from the PC bus 114 to the RRAD bus 149 via the BD bus 34 (see FIG. 2A) and the transceiver 150, or may be sent from the RRAD bus 149 to the PC bus 114, also via the transceiver 150 and the BD bus 34. Transceivers corresponding to the transceivers 148 and 150 are provided for communication to RAM 21, and are not shown to simplify the drawings. Such transceivers are respectively controlled by the 5MRRB and 5MRD signals from the 5M CTRL bus, and the 5PCRD signal from the 5P CTRL bus 32 and the 5PCRRB signal on conductor 104.

Figure 6A:
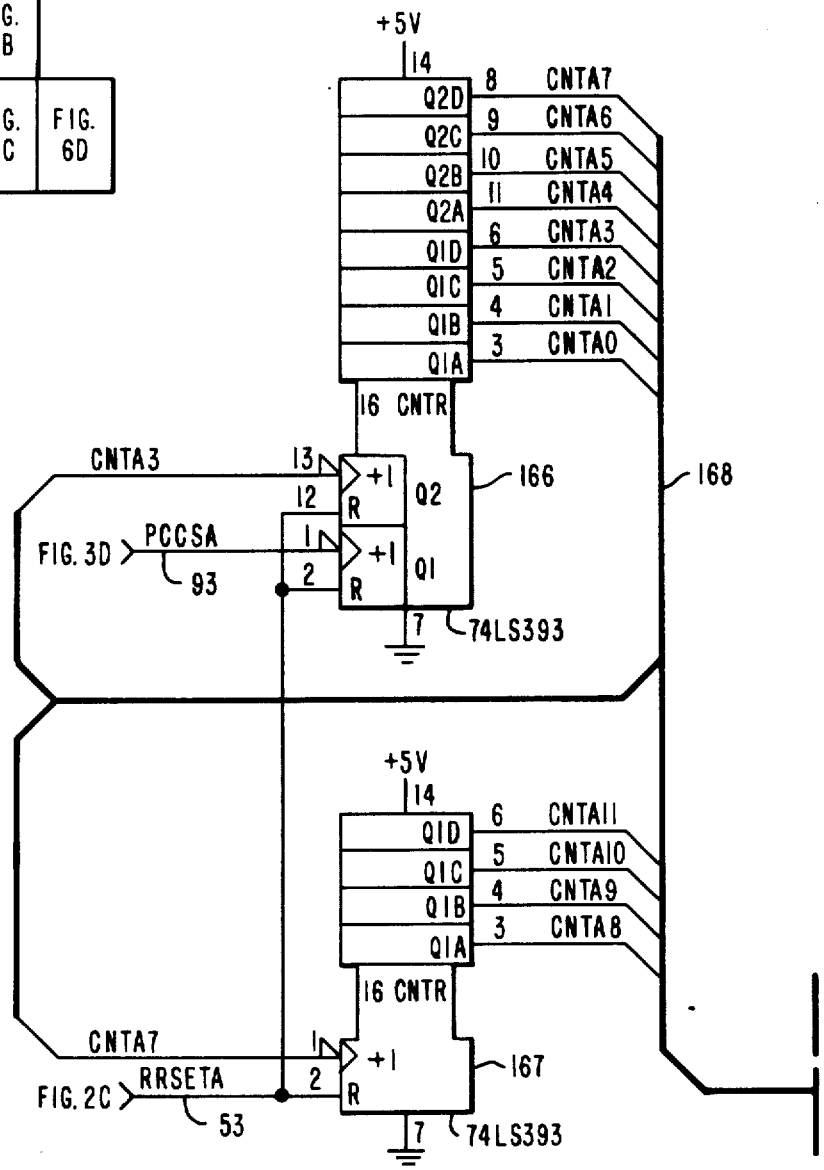
FIGS. 6A-6D, arranged in accordance with the map of FIG. 6, form a schematic diagram of a message RAM portion of the adapter of FIG. 1.
Figure 6B:
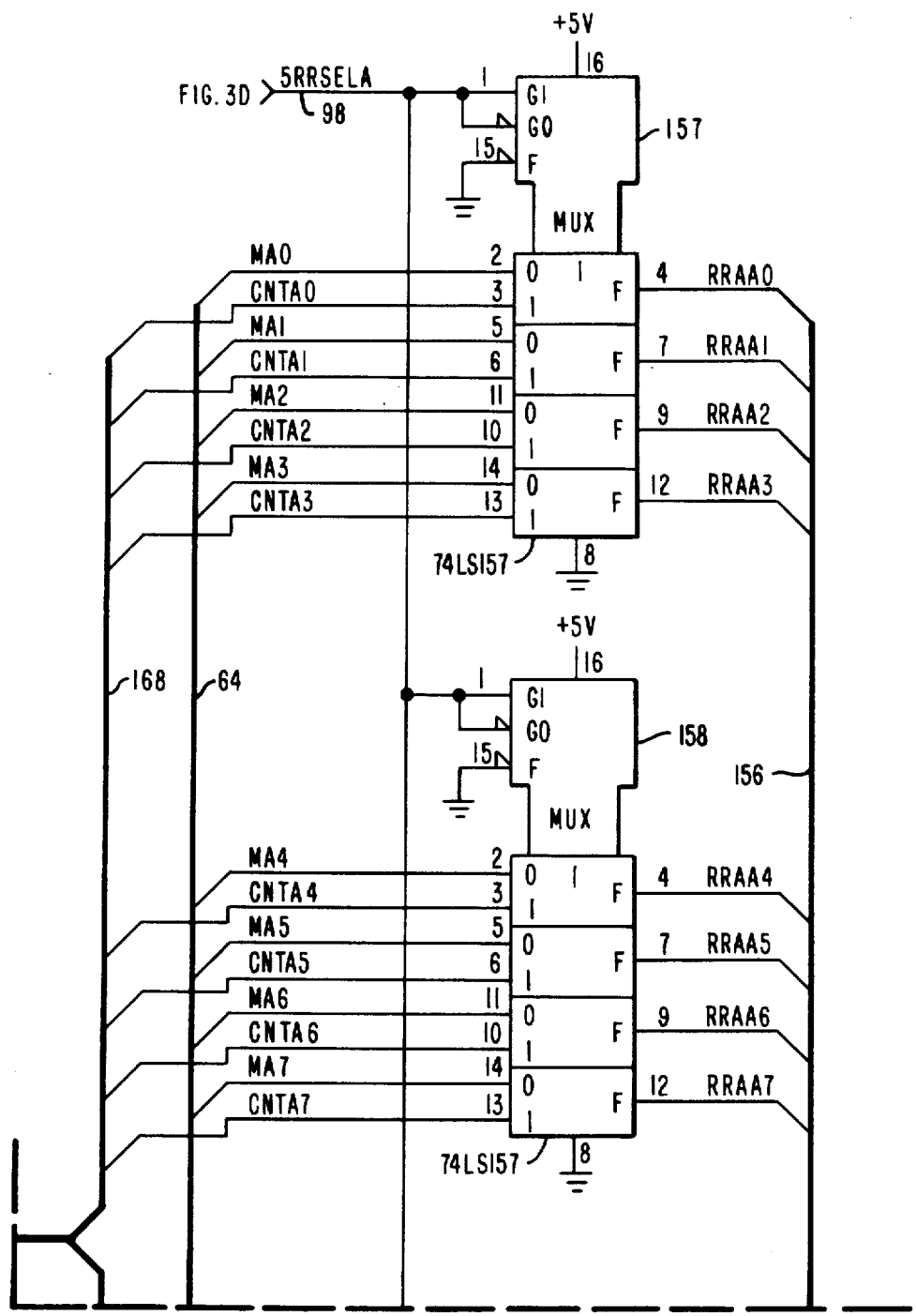
Figure 6C:
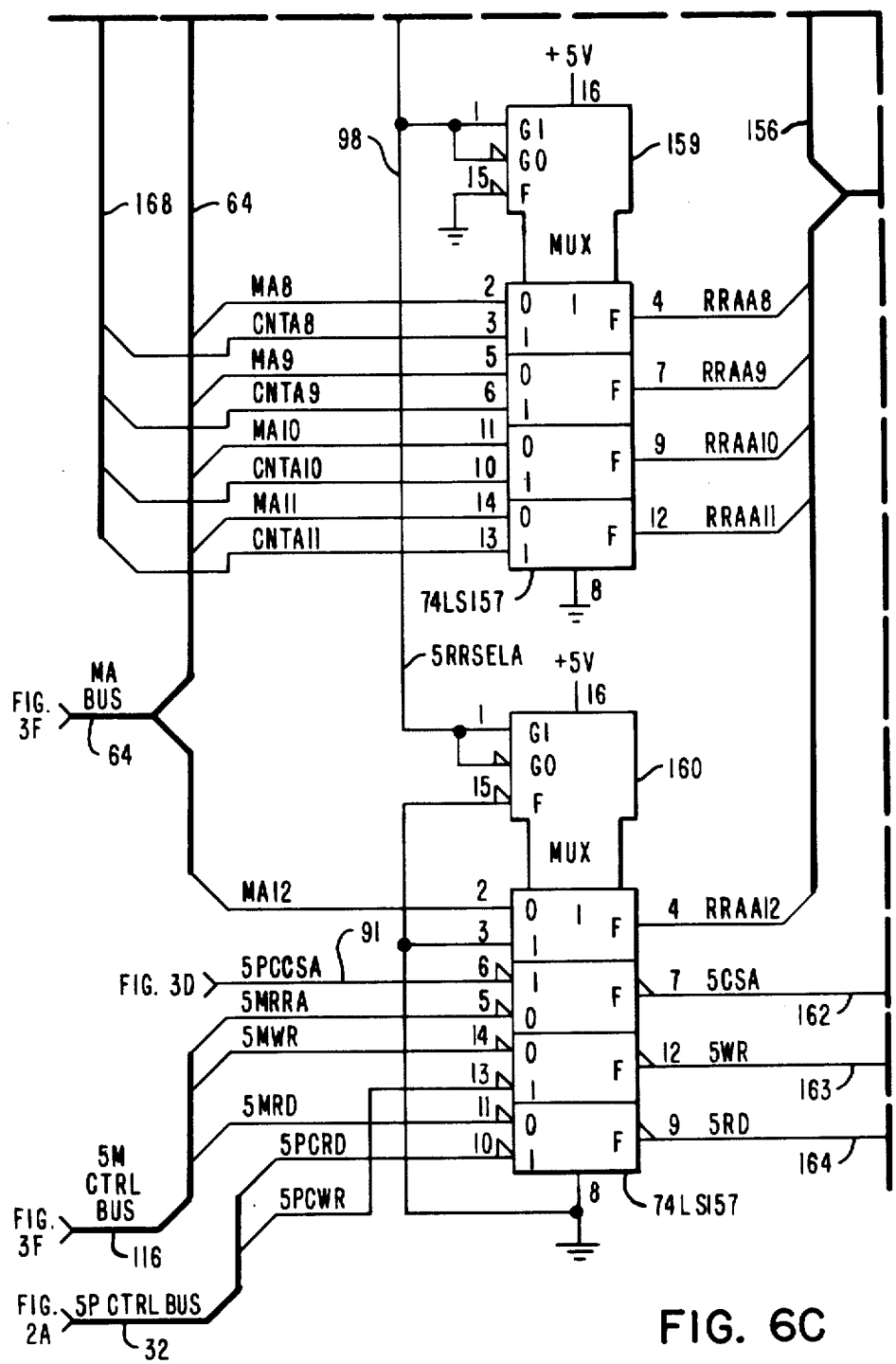
Figure 6D:
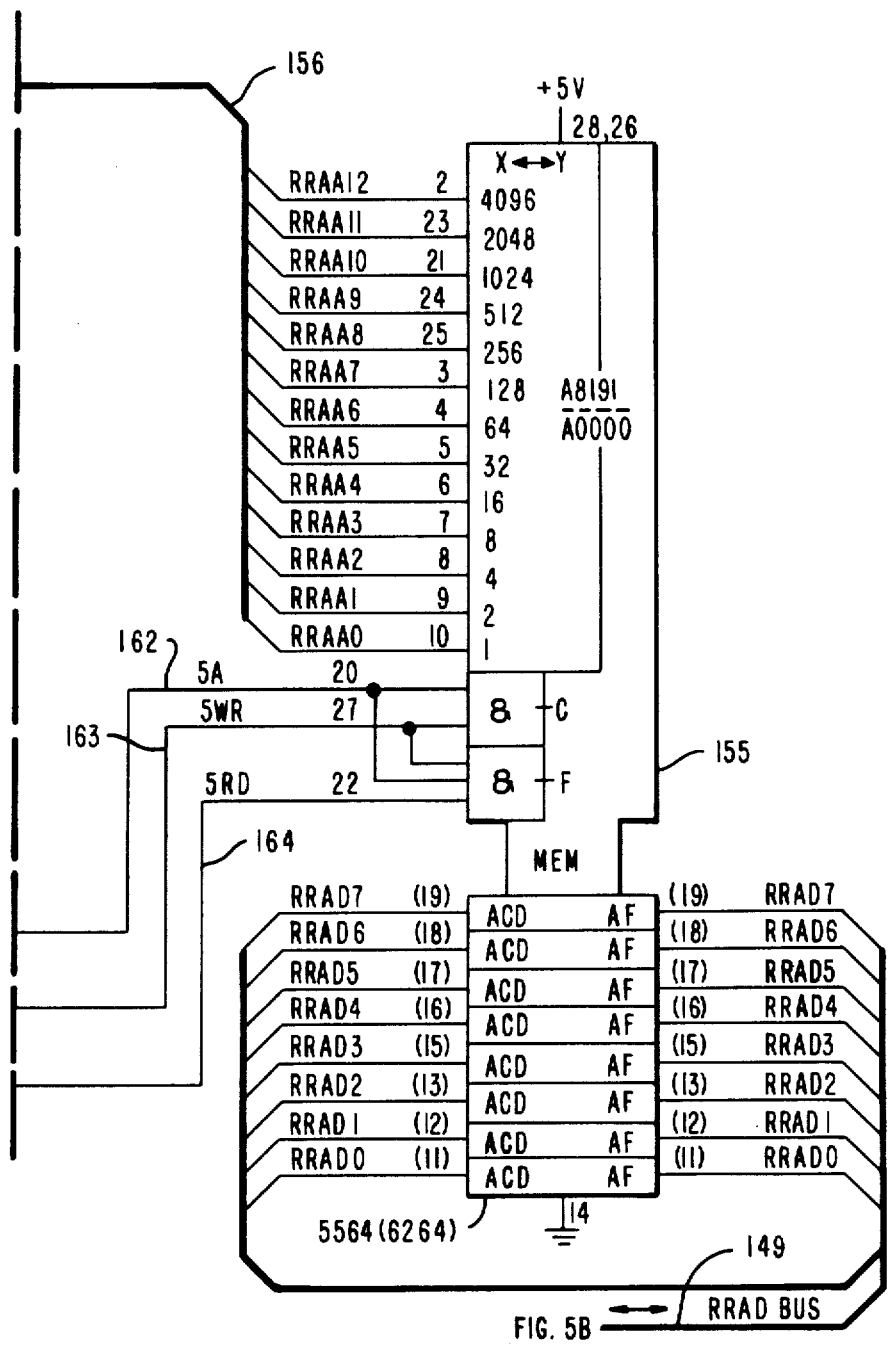

FIGS. 6A-6D, arranged as shown in the map of FIG. 6, form a schematic diagram for the RAM 20 (RAM A) of the adapter 10 of FIG. 1. A RAM device 155 of FIG. 6C is the same as the RAM 20 of FIG. 1. The data input/output pins of the RAM device 155 are connected to the RRAD bus 149 discussed in connection with FIG. 5B. The address terminals of the RAM device 155 are connected to a RAM address (RRAA) bus 156 for RAM 20. The address bits for the RRAA but 156 are supplied by the outputs of the multiplexers 157, 158, 159 and 160 of FIGS. 6B and 6C. The control signals chip select A (5CSA) write (5WR) and read (5RD) on conductors 162, 163 and 164, respectively, come from the output of the multiplexer 160 of FIG. 6C. The multiplexers 157-160 are controlled by 5RRSELA signal on conductor 98 of FIG. 3D. Thus when the 5RRSELA signal is in its zero state, the signals on the "0" inputs of the multiplexers 157-160 are multiplexed onto their outputs, and when the 5RRSELA signal is in its one state, the signals on the "1" inputs are multiplexed onto their outputs.

Referring to FIG. 6A, counter devices 166 and 167 provide a count value on counter address (CNTA) bus 168. The counter devices 166 and 167 are reset to zero by the RRSETA signal on conductor 53 of FIG. 2C, and their count is incremented with each pulse of the PCCSA signal on conductor 93 of FIG. 3D which is inputted into the clock input of pin 1 of the counter device 166. Thus, referring to FIGS. 2A, 2B and 2C, it will be seen that the PC 12 may reset the counters 166 and 167 to zero by addressing the address count reset circuitry of RAM 20 of the adapter 10 and issuing a write (5IOW) command over the PC bus 14. Referring to FIG. 3D, it will be seen that every read or write (see AND gate 88) addressed to the RAM 20 (see AND gate 89) will pulse the PCCSA signal on conductor 93, causing the count value on the CNTA bus 168 to be increased by one. As previously mentioned, the CNTA bus 168 is connected to the one inputs of the multiplexers 157-159 to be placed on the RRAA bus when the 5RRSELA signal on the conductor 98 is in its one state.

Referring to FIG. 6C, the 5CSA, 5WR and 5RD signals on the conductors 162, 163 and 164, respectively, are multiplexed by the multiplexer 160 from the 5M CTRL bus 116 when the 5RRSELA signal is zero, and from the conductor 91 of FIG. 3D and the 5P CTRL bus 32 when the 5RRSELA signal is one. It will thus be understood that when the PC 12 is reading data from or writing data to the RAM device 155, the count from the counter devices 166 and 167 will be used as the RAM address; and when the microcomputer 60 of FIG. 3B is reading data from or writing data to the RAM device 155, a value on the MA bus 64, which value was placed thereon by the microcomputer 60, will be used as the RAM address.

It will be understood that a circuit identical to the circuit of FIG. 6A-6D is provided in the adapter 10 for the RAM 21 (RAM B). In such a circuit, the signals PCCSB, RRSETB, 5RRSELB, 5PCCSB, and 5MMRB will be used instead of the signals PCCSA, RRSETA, 5RRSELA, 5PCCSA, and 5MMRA, respectively.

A comparison will now be made between the use of a RAM of the present invention and the use of a direct memory access controller for the PC 12 of FIG. 1. If the PC 12 is an IBM PC AT, the only instruction that is necessary to load 4K bytes of data is the REP OUTSB instruction, as previously mentioned. In this case, the CX parameter must be equal to 4096 and the DI parameter must point to the initial memory data address of the system of the PC 12. One of the RAMS (RAM A) must be selected such that its counters 166 and 167 are reset to zero and the RAM device 155 is connected to the PC device 12, all as previously described. As previously noted, the IBM PC AT uses the Intel 80286 microprocessor which operates at six megahertz, resulting in a clock cycle time of 167 nanoseconds. The 80286 microprocessor uses two clock cycles for a bus access, adds a one clock cycle wait state for a memory access, and adds a four clock cycle wait state for an eight bit bus operation to an eight bit device. Thus, the REP OUTSB instruction takes 5 plus 4n clock cycles, where the n is equal to the number of times the instruction is repeated. Also, the IBM PC AT adds 1 plus 5n clock cycles of wait states, where n is equal to the number of times the instruction is repeated. Therefore, the transfer of 4k bytes of RAM buffer data takes $(6+9) \times 4096$ clock cycles, or 6.16 milliseconds. On the other hand, the IBM PC AT DMA controller operates at 3 megahertz, which results in a clock cycle time of 333 nanoseconds. All DMA data transfer bus cycles take 5 clock cycles, or 1.66 milliseconds. Therefore, to transfer 4k bytes of data using an eight bit DMA channel requires 1.66 ms $\times$ 4096, or 6.8 milliseconds.

To read or write to one of the RAMS using an 8088/86 based PC requires a software loop, which is executed after appropriate registers are initialized. The software loop is as follows:

READ-RAM:
IN AL,DX ;DX EQUAL TO RAM PORT
STOSB MESSAGE-BUFFER-IN ;DI EQUAL TO MEMORY ADDRESS
LOOP READ-RAM ;REPEAT UNTIL CX EQUAL ZERO
WRITE-RAM:
LODSB MESSAGE-BUFFER-OUT ;SI EQUAL TO MEMORY ADDRESS
OUT DX,AL ;DX EQUAL TO RAM PORT
LOOP WRITE-RAM ;REPEAT UNTIL CX EQUAL ZERO

Thus, a system has been described which provides the aforementioned objects. It will be understood by those skilled in the art that the disclosed embodiment is exemplary only, and that various elements disclosed may be replaced by equivalents without departing from the invention hereof, which equivalents are covered by the appended claims.

What is claimed is:

1. A data transfer circuit for transferring data between a processor and a peripheral wherein said processor has a data and control bus for transmitting data and command signals, said data transfer circuit comprising:
   random access memory (RAM) means having a plurality of addressable storage locations for storing data and address input means for inputting the address of said storage locations when reading data to or writing data from said RAM means;
   first input/output means for connection to said data and control bus and being connected to said RAM means for transmitting data therebetween;
   second input/output means for connection to the peripheral and being connected to said RAM means for transmitting data therebetween;
   addressable means in said first input/output means addressable by data bits received from the data and control bus which, when addressed, connects said RAM means to said first input/output means;
   address counter means connected between said first input/output means and said address input means of said RAM means for supplying addresses thereto, said address counter means including reset means for resetting said address supplied therefrom to a set value when said addressable means is addressed; and
   incrementing means connected between said first input/output means and said address counter means for sequentially incrementing the address of said address counter means responsive to each read or write command signal received by said first input/output means from the data and control bus.

2. The data transfer circuit in claim 1 further comprising:
   control means in said second input/output means through which data is transferred between said RAM means and the peripheral.

3. The data transfer circuit of claim 2 wherein said control means supplies addresses to said address input means of said RAM means when data is to be transferred between the peripheral and said RAM means via said second input/output means.

4. The data transfer circuit of claim 3 further comprising multiplexer means having a first state for multiplexing addresses from said address counter means to said address input means when data is to be transferred between the processor and said RAM means, and having a second state for multiplexing addresses from said control means to said address input means when data is to be transferred between said control means and said RAM means.

5. The data transfer circuit of claim 2 further comprising:
   first interrupt means connected between said first input/output means and said control means for providing an interrupt signal to said control means when the processor has data to write into said RAM means; and
   second interrupt in second input/output means for providing an interrupt signal to said control means when the peripheral has data to write into said RAM means.

6. The data transfer circuit of claim 5 wherein said control means is an Intel 8031 microcomputer.

7. The data transfer circuit of claim 5 wherein said second input/output means includes a universal synchronous asynchronous receiver transmitter for converting parallel data from said RAM means to serial data for transmission to the peripheral, and for converting serial data received from the peripheral to parallel data for said RAM means.

8. The data transfer circuit of claim 7 wherein said universal synchronous asynchronous receiver transmitter is an Intel 8274 multi-protocol controller.

9. The data transfer circuit of claim 2 further comprising:
   first register means connected between said first input/output means and said control means for transmitting command and status signals between the processor and said control means; and
   second register means connected between said first input/output means and said control means for transmitting command and status signals between said control means and the processor.

10. The data transfer circuit of claim 2 wherein said second input/output means has an A channel for receiving data from a first peripheral and a B channel for receiving data from a second peripheral, and further comprising:
    second random access memory means for storing data from said second peripheral;
    second address counter means for supplying addresses to said second random access memory means, said second address counter means including reset means for resetting said address supplied therefrom to a set value when addressed; and
    wherein said addressable means includes means for decoding data bits from the data and control bus for addressing said second random access memory means and said second address counter means for transferring data between said second peripheral and the processor.

11. The data transfer circuit of claim 1 wherein said addressable means includes selectable switch means for setting a desired address into said addressable means.

* * * * *